(12) United States Patent
Lee et al.

(10) Patent No.: US 10,647,929 B2
(45) Date of Patent: May 12, 2020

(54) METHOD FOR CONVERTING HEAVY OIL BY MEANS OF HIGH ASPHALTENE DISPERSION

(71) Applicant: KOREA RESEARCH INSTITUTE OF CHEMICAL TECHNOLOGY, Daejeon (KR)

(72) Inventors: Chul Wee Lee, Daejeon (KR); Joung Mo Cho, Daejeon (KR); Sun Young Park, Gyeonggi-do (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 25 days.

(21) Appl. No.: 16/085,674

(22) PCT Filed: Mar. 8, 2017

(86) PCT No.: PCT/KR2017/002493
§ 371 (c)(1),
(2) Date: Sep. 17, 2018

(87) PCT Pub. No.: WO2017/160017
PCT Pub. Date: Sep. 21, 2017

(65) Prior Publication Data
US 2019/0031966 A1    Jan. 31, 2019

(30) Foreign Application Priority Data

Mar. 18, 2016  (KR) .................. 10-2016-0032943
Jul. 20, 2016  (KR) .................. 10-2016-0092177

(51) Int. Cl.
*C10G 45/08*    (2006.01)
*C10G 7/00*    (2006.01)
(Continued)

(52) U.S. Cl.
CPC ............ *C10G 45/08* (2013.01); *B01J 23/881* (2013.01); *B01J 37/343* (2013.01); *C10G 3/00* (2013.01); *C10G 7/00* (2013.01); *C10G 45/02* (2013.01); *C10G 47/34* (2013.01); *C10G 75/00* (2013.01); *C10G 75/04* (2013.01); *B01J 23/8873* (2013.01); *C10G 2300/107* (2013.01); *C10G 2300/1033* (2013.01); *C10G 2300/1077* (2013.01); *C10G 2300/206* (2013.01); *C10G 2300/80* (2013.01); *Y02P 30/20* (2015.11)

(58) Field of Classification Search
None
See application file for complete search history.

(56) References Cited

U.S. PATENT DOCUMENTS

2002/0035237 A1 * 3/2002 Lawson ............... A61K 8/0229
528/335
2014/0166541 A1    6/2014 Chabot et al.
(Continued)

FOREIGN PATENT DOCUMENTS

EP          0360500 A2    9/1989
JP        02-191696 A     7/1990
(Continued)

OTHER PUBLICATIONS

Son, Jeong-Mae et al., "Dispersing Properties of Heavy Crude Oil according o Dispersant Structures," *Journal of KSTLE*, Dec. 2015, vol. 31, No. 6, pp. 251-257.
(Continued)

*Primary Examiner* — Tam M Nguyen
(74) *Attorney, Agent, or Firm* — Occhiuti & Rohlicek LLP

(57) ABSTRACT

The present invention relates to a method for converting heavy oil by means of high dispersion of asphaltenes, comprising the steps of: preparing a mixture by mixing an amphiphilic additive and the heavy oil; and performing a hydrogenation reaction on the mixture, wherein the amphiphilic additive comprises both a polar group and a nonpolar group.

7 Claims, 4 Drawing Sheets

(51) Int. Cl.
*C10G 3/00* (2006.01)
*C10G 45/02* (2006.01)
*C10G 75/00* (2006.01)
*C10G 75/04* (2006.01)
*B01J 23/881* (2006.01)
*B01J 37/34* (2006.01)
*C10G 47/34* (2006.01)
*B01J 23/887* (2006.01)

(56) References Cited

U.S. PATENT DOCUMENTS

2014/0171299 A1\* 6/2014 Chabot ............... B01J 31/0247
502/206
2016/0032198 A1\* 2/2016 Schleiffer ............... B01J 8/008
585/350

FOREIGN PATENT DOCUMENTS

| JP | 2007-054753 A | 3/2007 |
| KR | 10-2015-0096689 A | 8/2015 |
| KR | 10-2015-0097575 A | 8/2015 |

OTHER PUBLICATIONS

Hwang, Jong Sic, "Process Simulation and Vacuum Distillation of Petroleum Atmospheric Residuum with Waste Lube Oils," *Korean Chemical Engineering Research* (Hwahak Konghak), 1997, vol. 15, No. 3, pp. 230-236.

\* cited by examiner

METHOD FOR CONVERTING HEAVY OIL BY MEANS OF HIGH ASPHALTENE DISPERSION

CROSS-REFERENCE TO RELATED APPLICATIONS

This application is a National Stage of International Application No. PCT/KR2018/002943, filed on Mar. 8, 2017, which claims priority to Korean Application No. 1020160032943, filed on Mar. 18, 2016, and Korean Application No. 1020160092177, filed on Jul. 20, 2016.

BACKGROUND OF THE INVENTION

Field of the Invention

The present invention relates to a method for preparing a raw material for high dispersion of asphaltene components present in the raw material in performing a hydrogenation reaction process of heavy oil, and a method for converting heavy oil by applying the same.

Related Art

Reaction technology for high-value addition through upgrading of heavy oil, especially a hydrogenation reaction, has a low restriction on a limit for the yield of the final product and on the raw materials, and thus many studies have been performed to develop new materials and new processes for improving the margin of the purification process.

Macromolecules (e.g., asphaltenes) are present in large amounts in heavy oil. Asphaltenes are easily converted into coke in a hydrocracking reaction process, which not only lowers the selectivity of the final product but also deposits in the facility, causing problems in stable operation of the process.

Among the prior art, there is a slurry-phased hydrocracking reaction process using a nano-sized dispersion catalyst activated from a lipophilic precursor. In this process, the dispersed catalyst is evenly distributed in the oil and can come close to the macromolecules to be decomposed with high probability.

However, the slurry-phased hydrocracking reaction process may have a limit on the yield and economic efficiency of the final product, because the dispersion catalysts are expensive but do not directly induce active dispersion of asphaltenes.

SUMMARY OF THE INVENTION

The present invention aims to provide a method for converting heavy oil that can improve reaction performance while simultaneously inhibiting the generation of coke during a hydrocracking reaction by inducing high dispersion of asphaltenes through the addition of an organic compound simultaneously having both polar and a non-polar functional group (hereinafter, an amphiphilic material).

The above object of the present invention can be achieved by a method for converting heavy oil by means of high dispersion of asphaltenes, which include the steps of preparing a mixture by mixing an amphiphilic additive and the heavy oil; and performing a hydrogenation reaction on the mixture, wherein the amphiphilic additive includes both a polar group and a non-polar group.

The dipole moment of the polar group may be greater than or equal to 1.1 Debye (D); the dipole moment of the non-polar group may be less than or equal to 0.5 Debye (D); and the net dipole moment of the amphiphilic additive may be greater than or equal to 0.6 Debye (D).

The amphiphilic additive may be in the form of a polymer having a number average molecular weight of 100 to 500,000.

The polar group may include at least one selected from amine, imide, amide, alcohol, phenol, ester, and methacrylate; and the non-polar group may include a polymer induced from any one or combination of ethylene, propylene, isobutylene, diene, and styrene.

The amphiphilic additive may be used in an amount of 0.01 wt % to 5 wt % in the mixture.

The amphiphilic additive may include at least one selected from polyisobutylene succinimide, poly isobutylene phenol-based dispersant, and polyacrylic-based dispersant.

The amphiphilic additive may include a product obtained from a bottom stream in which waste oil is distilled.

The method may further include obtaining a hydrocracking reaction catalyst which includes the bottom stream, in which the hydrocracking reaction is performed using the hydrocracking reaction catalyst, and the waste oil contains at least one metal component among molybdenum, iron, zinc, and copper.

The bottom stream may include 50 ppm to 3,000 ppm of molybdenum.

The bottom stream may further include 100 ppm to 5,000 ppm of iron, 1,000 ppm to 5,000 ppm of zinc, and 50 ppm to 5,000 ppm of copper.

The method may further include mixing at least one among Group VIII(b), Group VI(b), Group II(b), and Group I(b) transition metals, Group VI(a), Group V(a), Group VII(a), and Group IV(a) elements, and compounds containing the same in the bottom stream.

The mixing may be performed such that the amount of molybdenum is adjusted to be in an amount of 150 ppm to 5,000 ppm in the hydrocracking reaction catalyst.

Sonication may be applied during the mixing.

The bottom stream may include organic materials in an amount of 90.0 wt % to 99.5 wt %.

The above object of the present invention can be achieved by a method for converting heavy oil by means of high dispersion of asphaltenes, in which the method includes preparing an amphiphilic additive wherein the heavy oil contains an asphaltene component, and the net dipole moment of the amphiphilic additive is greater than or equal to 0.6 Debye (D); mixing the heavy oil and the amphiphilic additive and subjecting the heavy oil to a hydrogenation reaction using a catalyst, in which the hydrogenation reaction is performed in a state where the asphaltene component is dispersed by the amphiphilic additive.

The dipole moment of the polar group may be greater than or equal to 1.1 Debye (D), and the dipole moment of the non-polar group may be less than or equal to 0.5 Debye (D).

Advantageous Effects of the Invention

According to the present invention, a method of preparing a catalyst including an amphiphilic material, and a method of converting heavy oil that can improve high dispersion of asphaltenes, inhibition of coke generation, and reaction performance are provided.

DESCRIPTION OF EXEMPLARY EMBODIMENTS

Figure 1:
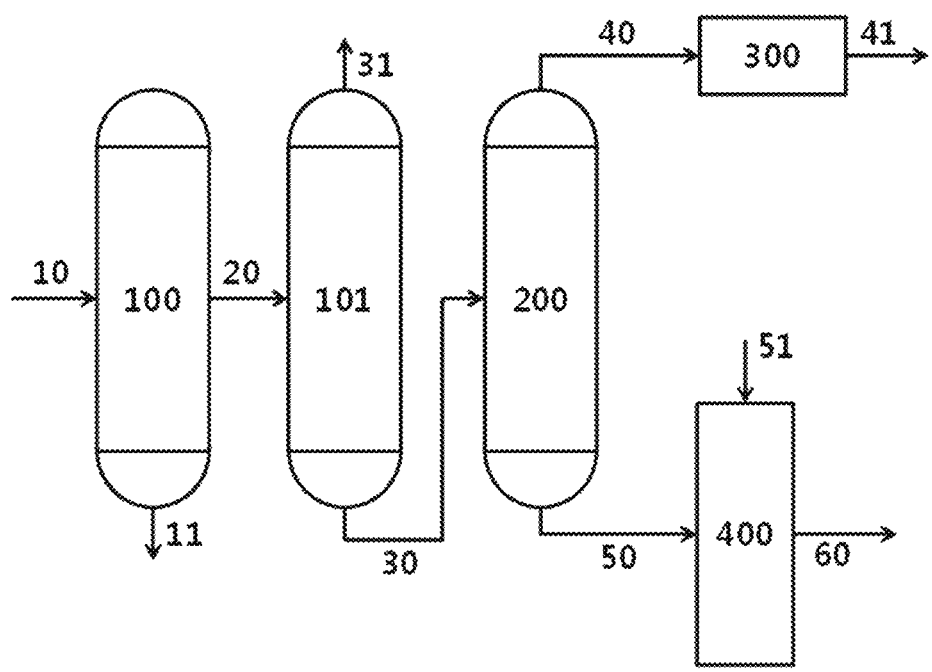
FIG. 1 illustrates the process of preparing a catalyst which contains an active ingredient for the high dispersion of asphaltenes from waste oil and a hydrocracking reaction according to an embodiment of the present invention.

The heavy oil of the present invention includes heavy oil generated from the refining process of crude oil, petrochemical process, and steel industry, or low-cost opportunity crude oil classified as low crude oil, and it also includes the super heavy oil.

The heavy oil present in the form of a mixture of polar and non-polar hydrocarbons contains a large amount of asphaltenes. Asphaltenes are mainly composed of aromatic hydrocarbons, and the asphaltene aggregate in the oil is a macromolecule having a molecular weight in a range of 1,000 to 2,000,000 and is a compound having polarity.

Asphaltenes have a low hydrogen/carbon (H/C) ratio and can readily evolve into solid carbon or coke during the pyrolysis process at high temperature, and this not only lowers the selectivity of the final product, but can also cause problems to settle in a series of transfer tubes, reactions, and separation processes. The asphaltene molecules present in the oil are present in an aggregated form in order to maintain a thermodynamically stable phase and coke formation may be accelerated or promoted by polyaromatization when exposed to high temperature reaction conditions.

Induction of even dispersion of asphaltenes in a hydrocracking reaction process can not only inhibit the formation of coke but also improve the effective area of contact of the catalyst to be used, thereby facilitating the material transfer of various reaction compounds including hydrogen being supplied as an excess counting reactant.

Asphaltene in heavy oil is a material with relatively high polarity, and although some exceptions are observed in some oil, resin has a lower polarity than asphaltene due to its high proportion of some non-polar functional groups. The constituting components in the heavy oil are a colloidal state of a core-shell structure in which the high-polarity asphaltenes are located in the center in an aggregated form, and resins surround these asphaltenes in a limited manner to form a boundary layer from non-polar hydrocarbon material.

When the amphiphilic material of the present invention is added, a polar functional group becomes aligned toward the materials with polarity and high dispersion of asphaltenes can be induced by offsetting a vector value representing a dipole moment.

Table 1 summarizes dipole moments for hydrogen and the molecules and functional groups that constitute the raw materials of heavy oil as reactants.

TABLE 1

Dipole moments for molecules and functional groups that constitute the reactants

| Classification | Material | Formula | Dipole moment, μ (Debye) | Reference |
|---|---|---|---|---|
| Saturate & Aromatics | Hydrogen | $H_2$ | 0.0 | [1] |
| | n-pentane | $C_5H_{12}$ | 0.0 | [1] |
| | n-heptane | $C_7H_{16}$ | 0.0 | [1] |
| | Toluene | $C_7H_8$ | 0.4 | [1] |
| | Methylcyclohexane | $C_7H_{14}$ | 0.0 | [1] |
| | p-Xylene | $C_8H_{10}$ | 0.1 | [1] |
| | Ethyl benzene | $C_8H_{10}$ | 0.4 | [1] |
| | Naphthalene | $C_{10}H_8$ | 0.0 | [1] |
| | Tetralin | $C_{10}H_{10}$ | 0.6 | [1] |
| | 1-Methyl naphthalene | $C_{11}H_{10}$ | 0.5 | [1] |
| | 2-Methyl naphthalene | $C_{11}H_{10}$ | 0.4 | [1] |
| | 2-Ethyl naphthalene | $C_{12}H_{12}$ | 0.6 | [2] |
| | 2-Methyl anthracene | $C_{16}H_{12}$ | 0.5 | [2] |
| | 2-Ethyl anthracene | $C_{16}H_{14}$ | 0.6 | [2] |
| Heteroatoms | Ethyl mercaptan | $C_2H_6S$ | 1.5 | [1] |
| | Dimethyl sulfide | $C_2H_6S$ | 1.5 | [1] |
| | Dimethyl sulfoxide | $C_2H_6OS$ | 4.0 | [2] |
| | Acetone | $C_3H_6O$ | 2.9 | [1] |
| | Thiophene | $C_4H_4S$ | 0.5 | [1] |
| | Pyrrole | $C_4H_5N$ | 1.8 | [1] |
| | Pyridine | $C_5H_5N$ | 2.3 | [1] |
| | Phenol | $C_6H_6O$ | 1.2 | [2] |
| Resins | — | — | 2.0-3.0 | [2] |
| Asphaltene | — | — | 3.0-7.0 | [2] |

[1] R. Reid et al./The Properties of Gases & Liquids/4th Ed./McGraw-Hill/(1988)

[2] L. Goual and A. Firoozabadi/Measuring Asphaltenes and Resins, and Dipole Moment in Petroleum Fluids/AIChE Journal/Vol. 48/2646-2663/(2002)

Table 2 shows dipole moments for the polar functional groups of an amphiphilic material composed of a multimolecular material expressed as values calculated based on quantum mechanics. The values were calculated based on density functional theory (DFT), and system potential was calculated using generalized gradient approximations, Perdew-Burke-Ernzerhof (GGA-PBE) as exchange-correlation functionals, and Becke(3-parameter)-Lee-Yang-Parr (B3LVP) as hybrid functionals, respectively. In the scope of the present invention, the dipole moment values were based on those calculated from the B3LVP function, which approximates the actual system, while the results from the GGA-PBE function were referenced to the qualitative analysis.

TABLE 2

Dipole moments of polar functional groups in amphiphilic material by DFT calculation

| Polar Functional Group | Examples of chemical structures (PIB: polyisobutenyl chain, R: alkyl chain) | Dipole moment, $\mu$ (Debye) | |
| --- | --- | --- | --- |
| | | GGA-PBE | B3LYP |
| Succinic anhydride | | 5.31 | 5.54 |
| Succinimide | | 2.65 | 2.84 |
| Succinic amide | | 1.24 | 1.11 |
| Phenol | | 1.33 | 1.38 |
| Pyridine | | 2.99 | 3.01 |
| Methacrylate | | 1.94 | 2.12 |
| Thiophosphonic acid | | 1.44 | 1.47 |
| Furanic ring | | 0.62 | 0.66 |
| Sorbitan ester | | 0.94 | 1.07 |
| Amine | | 1.83 | 1.89 |

TABLE 2-continued

Dipole moments of polar functional groups in amphiphilic material by DFT calculation

| Polar Functional Group | Examples of chemical structures (PIB: polyisobutenyl chain, R: alkyl chain) | Dipole moment, μ (Debye) | |
|---|---|---|---|
| | | GGA-PBE | B3LYP |
| Thiophosphonate | PIB—P(=S)(O-CH2-CH(R)-OH)(O-CH2-CH(R')-OH) | 2.96 | 2.80 |

Relative comparison of the dipole moments listed in Table 1 and Table 2 above, it is preferred that the amphiphilic material added in the hydrogenation reaction (i.e., an additive) have a polar group with a dipole moment of greater than or equal to 1.1 Debye (D) and a non-polar group with a dipole moment of less than or equal to 0.5 Debye (D) within the same molecule, and that these groups be structurally symmetric so that no net dipole moment can be canceled. The net dipole moment is preferably greater than or equal to 0.6 Debye (D). Since the raw materials to be applied to these additives are heavy oil having a hydrophobic property, the nature of the material itself is preferably hydrophobic or oil soluble.

The dipole moment of the polar group may be in the range of 1.1 Debye (D) to 3 Debye (D), 1.1 Debye (D) to 5 Debye (D), 1.1 Debye (D) to 7 Debye (D), or 1.1 Debye (D) to 10 Debye (D), but the dipole moment of the polar group is not limited thereto. The dipole moment of a non-polar group may have a value close to zero by definition, and depending on the relative strength of a dipole moment of the polarity group, may be less than or equal to 0.01 Debye (D), less than or equal to 0.1 Debye (D), and less than or equal to 0.5 Debye (D), but the dipole moment of the non-polar group is not limited thereto. The net dipole moment of the amphiphilic additive may be in the range of greater than or equal to 0.6 Debye (D) to 2 Debye (D), 0.6 Debye (D) to 5 Debye (D), or 0.6 Debye (D) to 10 Debye (D), but is not limited thereto.

Examples of the group having polarity may include a functional group induced from nitrogen or oxygen, and examples of the group having nonpolarity may include chain-type hydrocarbons in the form of a polymer having a linear or polydispersity index (PI; Mw/Mn) close to 1, or structures derived therefrom. These additives are preferably applied to a hydrogenation reaction of heavy oil such that they do not affect the properties of each final product produced after the reaction or the function of the catalyst, and it is preferred that a distinct dispersion effect of polar molecules in the oil appear even when a small amount of the additive is used relative to that of the raw material. This can be distinguished unlike a material which is well dispersed throughout a mixture of raw materials but does not show distinct selective interaction to polar molecules (e.g., hydrophobic oil soluble dispersion catalyst) or a material which has both hydrophilicity and hydrophobicity simultaneously (e.g., surfactants). This may be in a form that the polar functional group and the non-polar functional group are directly bonded, but it may be in a form modified by a connecting group or link.

The additive may be may be prepared in the form of a polymer which is formed by combination of one kind of a polar group selected from a single molecule or polymer comprised of single or multiple combination of amine, imide, amide, alcohol, phenol, ester, methacrylate, etc.; and one kind of a non-polar group selected from a homopolymer or co-polymer, which is induced from ethylene, propylene, isobutylene, diene, and styrene and has the number average molecular weight of 100 to 500,000, but the additives are not limited thereto.

The additive is used by mixing with heavy oil (i.e., a raw material of a hydrogenation reaction) and it may be added in a range of 0.01% to 5% in a weight ratio relative to the amount of a mixture. When the amount of the additive is less than 0.01% in a weight ratio, the polar polarity of the raw material may not be sufficiently dispersed and thus the effect may be insufficient. In contrast, when the amount of the additive is greater than 5% in a weight ratio, the throughput of the raw material may be limited and the molar ratio of the desired polar molecules to the total hydrocarbons is lowered thereby increasing the amount of hydrogen and catalyst being used and lowering the efficiency of the hydrogenation reaction.

In the mixing step, the additive may be mixed with a hydrogenation catalyst to maximize the hydrogenation reaction.

The additive may be added directly to the process separately from the hydrogenation catalyst. Alternatively, the additive may be prepared as a new catalyst or a precursor for the catalyst different in composition and components by stirring in advance along with the additive.

The hydrogenation reaction of heavy oil is achieved through the step of performing a hydrogenation reaction using a reactor, in which the mixture prepared from the above process is maintained under high temperature (350° C. to 500° C., although not limited thereto) and high pressure (100 atm to 150 atm, although not limited thereto) in the presence of hydrogen.

Meanwhile, in another embodiment, the additive of the present invention may be obtained from waste oil, and in particular from waste lubrication oil. In more detail, a tower top stream and a bottom stream are obtained by removing the solids from the waste oil and distillation of the waste oil in which the solids are removed. The waste lubricating oil contains an organic compound of molybdenum and a dispersant for dispersing carbon solids, and this dispersant can be used as an amphiphilic additive according to the present invention. Such a dispersant is mostly present in the bottom stream, and thus, all or part of the bottom stream may be used as a catalyst containing an amphiphilic additive according to the present invention.

The bottom stream contains other metal components, etc. in addition to an amphiphilic additive. The bottom stream may be further purified and used by independently separating an amphiphilic additive or the bottom stream may be used as it is along with other metal components, etc. When the bottom stream is used as it is, the amount of the bottom stream to be used is determined in consideration of the amount of the amphiphilic additive in the bottom stream. That is, additional amphiphilic additive may be used as necessary.

In the present invention, the bottom stream may be used as a catalyst for a hydrocracking reaction.

Referring to FIG. 1, the method of preparing a hydrocracking reaction catalyst containing an amphiphilic additive from waste oil will be explained.

Supply waste oil 10 is subjected to a process 100 for physically separating solids through a physical method such as centrifugation and filtration. The separated solids 11 is a material that appears in the form of a solid being formed by mechanical friction or oxidation of an oil, and it may include gigantic polymers, salts, metals, etc.

The waste oil stream 20 from which the solids are removed through the low-temperature distiller 101 maintained at 240° C. or lower, and supplied to the high-temperature distiller 200 through the bottom stream. When continuous treatment of raw materials is not required, removal of water content and separation of hydrocarbon oils are possible in a single distiller depending on the temperature section having different boiling points.

In the high-temperature distiller 200, the separation of the oil having a boiling point of 240° C. to 590° C. can be achieved, and distillation may be performed under reduced pressure so as to save energy.

The hydrocarbon vapor stream 40 (tower top stream, distilled components) at the top of the tower is recovered as an oil 41 through a condenser 300 and it can be used as an alternative fuel oil or regeneration base oil depending on the characteristics of the oil. The bottom stream 50 (residue components, retained components) is a residue component containing a hydrocarbon oil with high boiling point.

Then, at least one selected among Group VIII(b), Group VI(b), Group II(b), and Group I(b) transition metals, Group VI(a), Group V(a), Group VII(a), and Group IV(a) elements, and compounds containing the same is supplied 51 (supply of a precursor) and mixed. During this process, the components are mixed in an agitation tank 400, in which the temperature is increased to a temperature of 30° C. to 200° C. or 50° C. to 200° C., and thereby a hydrocracking reaction catalyst 60 in a well-dispersed form is recovered. The supply of a precursor 51 may be omitted in other embodiments, and in such a case, the bottom stream 50 becomes the very hydrocracking reaction catalyst 60.

As a step or pretreatment, a process of preparing the bottom stream 50 by exposing to sonication may be further included, and this process may be performed through a mixing process in an agitation tank or through an external device prepared separately.

Additionally, the application of sonication may be performed before the supply by a heavy oil conversion reaction after the supply of the precursor 51. The dispersibility of the active metal components and additives may be improved by the application of sonication.

Lubricating oil, which is a major component of waste oil, consists of more than 10 kinds of additives in addition to base oil waste oil. Generally, the base oil is a mineral oil obtained by subjecting high boiling point gas oil, which is obtained in the crude oil refining process, to a chemical reaction process (e.g., desulfurization, removal of unsaturated hydrocarbon, ring opening reaction, isomerization reaction, etc.); or a synthetic oil (e.g., poly-alpha-olefin, glycol, polyisobutylene, etc.) obtained by chemical synthesis. Examples of the additive include a clean dispersant that prevents precipitation of solids generated by oxidation or decomposition of oil in the machine and induces dispersion; an anti-wear agent to prevent excessive abrasion of mechanical parts; a corrosion inhibitor to prevent rust; a viscosity index improver that reduces the viscosity change of oil according to temperature change; a pour point depressant that improves low-temperature fluidity; an antifoaming agent that suppresses bubble formation and facilitates a fluid flow; an antioxidant that prevents oxidation of lubricating oil; an oiliness improver that reduces boundary friction; and additionally, a solid lubricant that improves lubrication performance and reduces friction; a friction modifier, etc. Among them, as an anti-wear agent, a solid lubricant, a friction modifier, etc., molybdenum dithiocarbamate (MoDTC), molybdenum dithiophosphate (MoDTP), etc., which are designed to be well dispersed in molybdenum disulfide or initially in oil, are generally used. Dialkyldithiophosphates (Zn-DTP), etc. may also be used to prevent partial oxidation and friction of the oil. A clean dispersant serves as a surfactant for inducing high dispersion of oil sludge, and a calcium salt or magnesium salt of an organic sulfonic acid, etc. may be added.

The bottom stream 50 obtained from the distillation process may correspond to 5 wt % to 50 wt % based on the waste oil added thereto, and the API degree may be in the range of 5 to 30.

The bottom stream 50 may contain 50 ppm to 3,000 ppm of molybdenum. Additionally, the bottom stream 50 may further contain 100 ppm to 5,000 ppm of iron, 1,000 ppm to 5,000 ppm of zinc, and/or 50 ppm to 5,000 ppm of copper.

When the precursor 51 is supplied, the molybdenum content of the hydrocracking reaction catalyst 60 may be increased to 150 ppm to 5,000 ppm. Additionally, the content of iron, zinc, and/or copper may be increased.

The content of organics in the hydrocracking reaction catalyst 60 may be from 90% to 99.5% in a weight ratio. When the content of organics is present in an amount of less than 90% in a weight ratio, the dispersibility of the active metals cannot be ensured and the catalytic properties may be lost due to phenomena, such as coagulation, coalescence, agglomeration, sedimentation, carbonization, etc. In contrast, when the content of organics exceeds 99.5% in a weight ratio, the amount of the catalyst to be used may be excessive, and thus, the amount of the raw material for throughput may be limited, and the concentration of the metals exhibiting activity may be lowered, thereby affecting the performance of heavy oil conversion due to a hydrocracking reaction.

The catalyst for a hydrocracking reaction obtained by the method described above may be used in the conversion of heavy oil. The heavy oil is converted to light oil by a catalyst for the hydrocracking reaction.

The hydrocracking reaction may be performed within a high-temperature high-pressure reactor of slurry-phase. The slurry-phased hydrocracking reaction process is a process, in which the raw material of heavy oil and hydrogen are reacted with a catalyst in a slurry form, and thereby (1) impurities (e.g., sulfur, nitrogen, nickel, vanadium and iron, etc.) present in the heavy oil are removed, and (2) low-boiling point, high-API synthetic petroleum or high valued added basic oil (LPG, naphtha, kerosene, vacuum gas oil, etc.) are prepared.

The temperature of the hydrocracking reaction may be in the range of 350° C. to 500° C. and the pressure of the hydrocracking reaction may be in the range of 100 atm to 150 atm. A step of agitation at a temperature from 50° C. to 200° C. where flow property is maintained for uniform mixing with the raw material before performing a hydrocracking reaction may be included.

The composition and amount of the catalyst may be adjusted considering the components of the metal composition of the bottom stream. The metal components of the bottom stream can perform the role of a catalyst in a hydrogenation reaction, and according to this embodiment, the amphiphilic additive and the catalyst become in a state mixed in advance.

Hereinafter, the present invention will be described in detail with reference to preferred experimental results.

Prior to this, terms and words used in the present specification and claims should not be construed as being limited to conventional or dictionary meanings, but should be interpreted as the meaning and concept corresponding to the technical idea of the present invention based on the principle that these terms can be properly defined by the inventors so as to explain the invention in the best way. Accordingly, the constitutions of the embodiments described in the present specification are merely the most preferred examples of the present invention and do not represent all of the technical ideas of the present invention. Therefore, it is to be understood that there are various equivalents and modifications that can replace these embodiments at the time of filing the present application.

Experiment 1: Experiment for Confirming Effects of Amphiphilic Additive

Experimental Example 1: Preparation of Mixture of Raw Materials for Dispersion of Polar Compounds in Heavy Oil The materials used as a feedstock in the evaluation of the hydrocracking reaction are the vacuum residue oils obtained from Hyundai Oilbank and the characteristics are as shown in Table 3. For the analysis of characteristics of the vacuum residue oils, the components of the elements and their respective contents were examined as follows: elemental analysis (Model: Thermo Scientific Flash 2000, detector: Thermal Conductivity Detector), X-ray fluorescence analysis (Model: Thermo/ARL QUANT'X), inductively coupled plasma-atomic emission spectrometry (ICP-AES; Model: Thermo Fisher Scientific iCAP 6500Duo) were used; and for Saturates, Aromatics, Resins and Asphaltenes (SARA) content analysis was determined by SARA analyzer (Model: Latroscan MK6s), boiling point distribution by ASTM D7169 (GC-Simdis) method, and non-degradable carbon residue (Conradson carbon residue; CCR) by ASTM D189.

TABLE 3

Characteristics of vacuum residue oils

| Analysis Items | | Results |
|---|---|---|
| Analysis of Elements (wt %) | C | 83.4 |
| | H | 10.1 |
| | N | 0.6 |
| | S | 5.5 |
| | O | — |
| Heavy Metal Content (mg/kg) | Ni | 74 |
| | V | 325 |
| SARA Analysis (Area %) | S | 5 |
| | A | 53 |
| | R | 13 |
| | Asph | 29 |
| API | | 4.10 |
| Distillation curve | >524° C. | 85% |
| CCR | | 23.3 wt % |

S: Saturates,
A: Aromatics,
R: Resins,
Asph: Asphaltenes

One kind of an amphiphilic additive selected was quantified and added to the vacuum residue oil (40 g), and the mixture was agitated at 80° C. for 4 hours and prepared as the raw material of a hydrocracking reaction.

Experimental Example 2: Mixture of Heavy Oil and Mo-Octoate

Mo-octoate (Shepherd Chemical Co.; Mo Content 15%; oxidation number 3.8), an organometallic compound, was quantified and added to the vacuum residue oil (40 g), whose characteristics are disclosed in Experimental Example 1, and the mixture was agitated at 80° C. for 4 hours and prepared as the raw material of a hydrocracking reaction.

Experimental Example 3: Mixture of Heavy Oil and Mo(CO)$_6$

Molybdenum hexacarbonyl (Mo(CO)$_6$; Alfa Aesar Co.; Catalog #: 89307), a general precursor instead of an organic metal, was quantified and added to the vacuum residue oil (40 g), whose characteristics are disclosed in Experimental Example 1, and the mixture was agitated at 80° C. for 4 hours and prepared as the raw material of a hydrocracking reaction.

Experimental Example 4: Mixture of Heavy Oil and Fe-Octoate

Fe-octoate (Iron(III) 2-ethylhexanoate; Alfa Aesar Co.; Catalog #: 89307) was quantified and added to the vacuum residue oil (40 g), whose characteristics are disclosed in Experimental Example 1, and the mixture was agitated at 80° C. for 4 hours and prepared as the raw material of a hydrocracking reaction.

Experimental Example 5: Preparation of Hydrocracking Reaction Catalyst to which Additive is Added, and Mixing the Same with Raw Material Mo-octoate, an organometallic compound, was quantified and added to one kind of an amphiphilic additive selected, and the mixture was agitated at 80° C. for 4 hours and prepared as the raw material of a hydrocracking reaction. The prepared catalyst was quantified and added to vacuum residue oil (40 g), and the mixture was agitated at 80° C. for 4 hours and prepared as the raw material of a hydrocracking reaction.

Experimental Example 6: Preparation of Hydrocracking Reaction Catalyst to which Additive is Added, and Mixing the Catalyst with Raw Material Molybdenum hexacarbonyl was quantified and added to one kind of an amphiphilic additive selected, and the mixture was agitated at 80° C. for 4 hours and prepared as the raw material of a hydrocracking reaction. The prepared catalyst was quantified and added to vacuum residue oil (40 g), and the mixture was agitated at 80° C. for 4 hours and prepared as the raw material of a hydrocracking reaction.

Experimental Example 7: Preparation of Hydrocracking Reaction Catalyst to which Additive is Added, and Mixing the Catalyst with Raw Material Fe-octoate was quantified and added to one kind of an amphiphilic additive selected, and the mixture was agitated at 80° C. for 4 hours and prepared as the raw material of a hydrocracking reaction. The prepared catalyst was quantified and added to vacuum residue oil (40 g), and the mixture was agitated at 80° C. for 4 hours and prepared as the raw material of a hydrocracking reaction.

Experimental Example 8: Preparation of Pitch by Solvent Extraction Process of Asphaltenes, and Mixing the Pitch with Hydrocracking Reaction Catalyst Vacuum residue oil (50 g), whose characteristics are disclosed in Experimental Example 1, was added to n-heptane (Sigma-Aldrich Corp.; Catalog #: 650536-1L) and mixed in a 1:50 weight ratio, agitated at room temperature for 2 hours and stabilized for 3 hours to obtain phase separation, and the precipitated layer was collected, and then pitch in which are concentrated was prepared using a vacuum rotary evaporator (Manufacturer: Buchi, Model: R-215 with vacuum controller, V-855) in which a hot water pot was maintained at 100° C. or higher.

The prepared pitch was analyzed in the same manner as the SARA analysis used in Experimental Example 1 to examine the level of concentration of asphaltenes and resins, and the results are summarized in Table 4 below.

TABLE 4

| Results of SARA analysis of pitch | | |
|---|---|---|
| Analysis Items | | nC7 Pitch |
| SARA | S | — |
| Analysis | A | — |
| (Area %) | R | 20.7% |
| | Asph | 79.3% |

In preparing the raw materials of a hydrocracking reaction, the raw materials of a hydrocracking reaction were prepared in the same manner as in Experimental Example 2 except that pitch, instead of a vacuum residue oil, was mixed in the same ratio and used.

Experimental Example 9: Preparation of Pitch by Solvent Extraction Process of Asphaltenes, and Mixing the Pitch with Hydrocracking Reaction Catalyst In preparing the raw materials of a hydrocracking reaction, the raw materials of a hydrocracking reaction were prepared in the same manner as in Experimental Example 5 except that pitch, instead of a vacuum residue oil, prepared in Experimental Example 8 was mixed in the same ratio and used.

Experimental Example 10: Measurement of Solubility with Regard to Raw Material of Hydrogen The vacuum residue oil, whose characteristics are disclosed as in Experimental Example 1, and the raw material where an amphiphilic material was added to the vacuum residue oil was quantified, transferred to a high-pressure reactor maintained at constant temperature and hydrogen pressure, and the solubility of hydrogen was measured. After placing the prepared raw material (40 g ($m_{VR}$)) in the high-pressure reactor, maintained at isothermal conditions (300K), and the process of fill-up of high-purity hydrogen (99.9% or higher) and purging were performed several cycles, and then the hydrogen flow was stopped so that the measured absolute pressure could reach 70 bar ($p_0$). When the temperature of the reactor was raised to reach the measurement temperature, agitation was performed through an impeller maintained at 500 rpm for 15 minutes, and the equilibrium pressure ($p_e$) was measured and recorded by allowing sufficient time such that no change in pressure could be observed. The equilibrium pressure was observed while changing the measurement temperature and the undissolved hydrogen was assumed to be an ideal gas, and the solubility with regard to the raw material of hydrogen was calculated from the following equation.

$$\text{Solubility (mg } H_2 \text{ per } g \text{ } VR) = \frac{[T(p_0/T_0) - p_e] \times V/(RT) \times M_{H2} \times 1,000}{m_{VR}}$$

In the above equation, $M_{H2}$ represents the molecular weight of hydrogen molecule, and R represents universal gas constant.

The temperature was measured within the range that the thermal cracking below the boiling point of the raw material did not occur. After the measurement, it was confirmed that there was no chemical change of the raw material due to leakage of hydrogen and thermal cracking, by lowering the temperature to room temperature close to the initial temperature and comparing with the initial pressure.

Experimental Example 11: Measurement of Degree of Dispersion of Asphaltenes

The degree of dispersion of asphaltenes was measured for some of the raw materials prepared in Experimental Examples above, using the Turbiscan (Manufacturer: Formulation, Model: MA2000) according to ASTM D7061-04. ASTM D7061-04 is a method for standardization to evaluate dynamic stability of oil by optically measuring the relative degree of dispersion according to sedimentation or phase separation of asphaltenes after adding n-heptane (non-polar solvent) to heavy oil dissolved in a polar solvent, followed by conversion into a separability number. The separability number is a value of standard deviation with regard to the change in average degree of permeability measured ($X_i$) every minute until the 15 minutes of stabilization time can be calculated by the equation below.

$$S = \sqrt{\frac{\sum_{i=1}^{n}(x_i - x_r)^2}{n-1}}$$

By definition, $X_T$ represents an arithmetic mean value of the average degree of permeability measured, and n represents the number of samples, i.e., 16.

Experimental Example 12: Evaluation of Initial Performance of Vacuum Residue Oil in Hydrocracking Reaction The reaction conditions were follows: initial temperature 80° C., initial pressure 80 bar, reaction temperature 430° C., reaction time 2 hours, and agitation speed 1,500 rpm. The vacuum residue oil (40 g) was added to a 250 mL batch-type reactor and reacted under the above reaction conditions, and the product was analyzed.

Experimental Example 13: Evaluation of Performance of Vacuum Residue Oil in Hydrocracking Reaction The experiment was performed in the same manner as in Experimental Example 12 except that the reaction time was 4 hours.

Experimental Example 14: Evaluation of Performance of SDA Pitch with High Content of Asphaltenes in Hydrocracking Reaction The reaction conditions were follows: initial temperature 80° C., initial pressure 80 bar, reaction temperature 430° C., reaction time 1 hour, and agitation speed 1,500 rpm. The pitch prepared in Experimental Example 8 (20 g) was added to a 100 mL batch-type reactor and reacted under the above reaction conditions, and the product was analyzed.

COMPARATIVE EXAMPLE AND EXAMPLE

Comparative Example 1

The vacuum residue oil (40 g) was subjected to a hydrocracking reaction according to Experimental Example 12 without adding a metal precursor or amphiphilic material (additive).

Comparative Example 2

In preparing the raw materials of a hydrocracking reaction according to Experimental Example 2, Mo-octoate was prepared such that the molybdenum content relative to the vacuum residue oil became 250 ppm, and thereby a hydrocracking reaction was performed according to Experimental Example 12.

Comparative Example 3

A hydrocracking reaction was performed in the same manner as in Comparative Example 2 except that the molybdenum content relative to the vacuum residue oil was adjusted to 1,000 ppm.

Comparative Example 4

In preparing the raw materials of a hydrocracking reaction according to Experimental Example 3, molybdenum hexacarbonyl was prepared such that the molybdenum content relative to the vacuum residue oil became 250 ppm, and thereby a hydrocracking reaction was performed according to Experimental Example 12.

Comparative Example 5

A hydrocracking reaction was performed in the same manner as in Comparative Example 4 except that the molybdenum content relative to the vacuum residue oil was adjusted to 1,000 ppm.

Comparative Example 6

In preparing the raw materials of a hydrocracking reaction according to Experimental Example 4, Fe-octoate was prepared such that the iron content relative to the vacuum residue oil became 250 ppm, and thereby a hydrocracking reaction was performed according to Experimental Example 12.

Comparative Example 7

In preparing the raw materials of a hydrocracking reaction according to Experimental Example 5, SPAN® 80 (Polyoxyethylene sorbitan, Sigma-Aldrich Corp.; Catalog #: 85548-250ML) was added to 0.5% in a weight ratio relative to the vacuum residue oil (40 g), and Mo-octoate was prepared such that the molybdenum content relative to the vacuum residue oil became 250 ppm, and thereby a hydrocracking reaction was performed according to Experimental Example 12.

Comparative Example 8

A hydrocracking reaction was performed in the same manner as in Comparative Example 7 except that TWEEN® 80 (Polyoxyethylene sorbitan ester, Supplier: Sigma-Aldrich Corp.; Catalog #: P4780-500ML), instead of SPAN® 80, was added to 0.5% in a weight ratio relative to the vacuum residue oil.

Comparative Example 9

In preparing the raw materials of a hydrocracking reaction according to Experimental Example 8, Mo-octoate was prepared such that the molybdenum content relative to the prepared pitch became 250 ppm, and thereby a hydrocracking reaction was performed according to Experimental Example 14.

Example 1

In preparing the raw materials of a hydrocracking reaction according to Experimental Example 1, polyisobutylene succinimide(polyisobutylene succinimide; ($N_mH_{m+1}C_{2m}H_{4m}$)($C_4H_3O_2N$)($C_nH_{2n+1}C_{3(n-1)}H_{6(n-1)}$) (m=0.57, n=16.4); Mn=1,000) was added to 0.5% in a weight ratio relative to the vacuum residue oil (40 g), and Mo-octoate was prepared such that the molybdenum content relative to the vacuum residue oil became 250 ppm, and thereby a hydrocracking reaction was performed according to Experimental Example 12.

Example 2

In preparing the raw materials of a hydrocracking reaction according to Experimental Example 5, polyisobutylene succinimide was added to 0.5% in a weight ratio relative to the vacuum residue oil (40 g), and Mo-octoate was prepared such that the molybdenum content relative to the vacuum residue oil became 250 ppm, and thereby a hydrocracking reaction was performed according to Experimental Example 12.

Example 3

In preparing the raw materials of a hydrocracking reaction according to Example 2, a hydrocracking reaction was performed in the same manner as in Example 2 except that Mo-octoate was added such that the molybdenum content relative to the vacuum residue oil became 1,000 ppm.

Example 4

A hydrocracking reaction was performed in the same manner as in Example 3 except that the reaction time was adjusted to 4 hours according to Experimental Example 13.

Example 5

In preparing the raw materials of a hydrocracking reaction according to Experimental Example 6, polyisobutylene succinimide was added to 0.5% in a weight ratio relative to the vacuum residue oil (40 g), and molybdenum hexacarbonyl was prepared such that the molybdenum content relative to the vacuum residue oil became 250 ppm, and thereby a hydrocracking reaction was performed according to Experimental Example 12.

Example 6

In preparing the raw materials of a hydrocracking reaction according to Example 11, a hydrocracking reaction was performed in the same manner as in Example 11 except that molybdenum hexacarbonyl was added such that the molybdenum content relative to the vacuum residue oil became 1,000 ppm.

Example 7

A hydrocracking reaction was performed in the same manner as in Example 6 except that the reaction time was adjusted to 4 hours according to Experimental Example 13.

Example 8

In preparing the raw materials of a hydrocracking reaction according to Experimental Example 7, polyisobutylene succinimide was added to 0.5% in a weight ratio relative to the vacuum residue oil (40 g), and Fe-octoate was prepared such that the iron content became 250 ppm, and thereby a hydrocracking reaction was performed according to Experimental Example 12.

Example 9

A hydrocracking reaction was performed in the same manner as in Example 2 except that polyisobutylene succinimide was added to 0.1% in a weight ratio relative to the vacuum residue oil.

Example 10

A hydrocracking reaction was performed in the same manner as in Example 2 except that polyisobutylene succinimide was added to 0.3% in a weight ratio relative to the vacuum residue oil.

Example 11

A hydrocracking reaction was performed in the same manner as in Example 2 except that polyisobutylene succinimide was added to 1.0% in a weight ratio relative to the vacuum residue oil.

Example 12

A hydrocracking reaction was performed in the same manner as in Example 2 except that polyisobutylene succinimide was added to 5.0% in a weight ratio relative to the vacuum residue oil.

Example 13

A hydrocracking reaction was performed in the same manner as in Example 2 except that a mixture of polyisobutenyl phenol (60% to 70% in a weight ratio) and polyisobutylene succinimide (30% to 40% in a weight ratio) (EMAX Solutions Co., Ltd., Mn=1,000), instead of polyisobutylene succinimide, was added to 0.5% in a weight relative to the vacuum residue oil.

Example 14

A hydrocracking reaction was performed in the same manner as in Example 2 except that a (dimethylaminoethyl methacrylate)-(methyl methacrylate) copolymer (EMAX Solutions Co., Ltd., Mn=1,000), instead of polyisobutylene succinimide, was added to 0.5% in a weight ratio relative to the vacuum residue oil.

Example 15

In preparing the raw materials of a hydrocracking reaction according to Experimental Example 9, polyisobutylene succinimide was added to 0.5% in a weight ratio relative to the prepared pitch (20 g), and Mo-octoate was prepared such that the molybdenum content became 250 ppm, and thereby a hydrocracking reaction was performed according to Experimental Example 14.

Hereinbelow, the addition conditions of the transition metal catalysts and the additives according to Comparative Examples and Examples are summarized in Table 5 below.

TABLE 5

Constitution of materials applicable to hydrocracking reaction according to Comparative Examples and Examples

| Classification | Raw Material | Amphiphilic Material and Amount Added | Metal Precursor and Amount Added | Time for Hydrocracking Reaction |
|---|---|---|---|---|
| Comparative Example 1 | VR 40 g | — | — | 2 hr |
| Comparative Example 2 | VR 40 g | — | Mo-octoate (Mo 250 ppm) | 2 hr |

TABLE 5-continued

Constitution of materials applicable to hydrocracking reaction according to Comparative Examples and Examples

| Classification | Raw Material | Amphiphilic Material and Amount Added | Metal Precursor and Amount Added | Time for Hydrocracking Reaction |
|---|---|---|---|---|
| Comparative Example 3 | VR 40 g | — | Mo-octoate (Mo 1,000 ppm) | 2 hr |
| Comparative Example 4 | VR 40 g | — | Mo(CO)$_6$ (Mo 250 ppm) | 2 hr |
| Comparative Example 5 | VR 40 g | — | Mo(CO)$_6$ (Mo 1,000 ppm) | 2 hr |
| Comparative Example 6 | VR 40 g | — | Fe-octoate (Fe 250 ppm) | 2 hr |
| Comparative Example 7 | VR 40 g | SPAN®80 0.5 wt % | Mo-octoate (Mo 250 ppm) | 2 hr |
| Comparative Example 8 | VR 40 g | TWEEN®80 0.5 wt % | Mo-octoate (Mo 250 ppm) | 2 hr |
| Comparative Example 9 | nC7 pitch 20 g | — | Mo-octoate (Mo 1,000 ppm) | 1 hr |
| Example 1 | VR 40 g | PIB-SI[a] 0.5 wt % | — | 2 hr |
| Example 2 | VR 40 g | PIB-SI 0.5 wt % | Mo-octoate (Mo 250 ppm) | 2 hr |
| Example 3 | VR 40 g | PIB SI 0.5 wt % | Mo-octoate (Mo 1,000 ppm) | 2 hr |
| Example 4 | VR 40 g | PIB SI 0.5 wt % | Mo-octoate (Mo 1,000 ppm) | 4 hr |
| Example 5 | VR 40 g | PIB SI 0.5 wt % | Mo(CO)$_6$ (Mo 250 ppm) | 2 hr |
| Example 6 | VR 40 g | PIB SI 0.5 wt % | Mo(CO)$_6$ (Mo 1,000 ppm) | 2 hr |
| Example 7 | VR 40 g | PIB SI 0.5 wt % | Mo(CO)$_6$ (Mo 1,000 ppm) | 4 hr |
| Example 8 | VR 40 g | PIB SI 0.5 wt % | Fe-octoate (Fe 250 ppm) | 2 hr |
| Example 9 | VR 40 g | PIB SI 0.1 wt % | Mo-octoate (Mo 250 ppm) | 2 hr |
| Example 10 | VR 40 g | PIB SI 0.3 wt % | Mo-octoate (Mo 250 ppm) | 2 hr |
| Example 11 | VR 40 g | PIB SI 1.0 wt % | Mo-octoate (Mo 250 ppm) | 2 hr |
| Example 12 | VR 40 g | PIB SI 5.0 wt % | Mo-octoate (Mo 250 ppm) | 2 hr |
| Example 13 | VR 40 g | PIB Ph[b] 0.5 wt % | Mo-octoate (Mo 250 ppm) | 2 hr |
| Example 14 | VR 40 g | Poly-Acryl[c] 0.5 wt % | Mo-octoate (Mo 250 ppm) | 2 hr |
| Example 15 | nC7 pitch 20 g | PIB SI 0.5 wt % | Mo-octoate (Mo 1,000 ppm) | 1 hr |

[a]PIB SI: Polyisobutenyl succinimde
[b]PIB Ph: Polyisobutenyl Phenol + Polyisobutenyl succinimde
[c]Poly-Acryl: block copolymer of dimethylaminoethyl methacrylate and methyl methacrylate The vacuum residue oil, which corresponds to an example of a heavy oil, is the heaviest oil obtained from the distillation process under the atmospheric pressure and reduced pressure in the crude oil refining process, and the residue components having a boiling point higher than 524° C. account for 82% or more. This is a relatively low-value raw material because it has a high viscosity and a high impurity content, it is possible to convert it to high-value liquefied light oil through thermal cracking. The high-valued liquefied light oil may be classified into naphtha, middle distillate, gas oil, etc. depending on the boiling point. Meanwhile, toluene insoluble (coke) is a byproduct which can no longer be converted to the above high-value liquid light oil along with the progress of a hydrocracking reaction proceeds, and if it is produced at a high ratio, it may cause many problems in the process. In particular, it may inactivate used catalysts, deposit in the reactor and unit process and prevent the transfer of raw materials or reaction products thus negatively affecting the normal and stable operation. Accordingly, it is desirable to design the catalyst to minimize the production of toluene insoluble or to control the amount of additives.

<Measurement of Solubility of Hydrogen in Oil>

According to Experimental Example 10, the hydrogen solubility of vacuum residue oils and raw materials, in which polyisobutylene succinimide (PIB SI) (i.e., an amphiphilic material) is added to the vacuum residue oils, was measured according to temperature, and the results are shown in Table 6 below.

TABLE 6

Change in hydrogen solubility with regard to vacuum residue oils and raw materials, in which amphiphilic material is added to the vacuum residue oils

| | VR | | VR + PIB SI (1.0 wt %) | |
|---|---|---|---|---|
| Equilibrium Temperature (K) | Equilibrium Pressure (abs. bar) | Solubility (mg/g) | Equilibrium Pressure (abs. bar) | Solubility (mg/g) |
| 300 | 69.8 | 0.00 | 69.8 | 0.00 |
| 353 | 80.4 | 0.77 | 80.3 | 0.80 |
| 403 | 90.0 | 1.44 | 90.1 | 1.40 |
| 453 | 98.3 | 2.41 | 98.5 | 2.35 |
| 503 | 106.7 | 3.16 | 106.3 | 3.28 |
| 553 | 114.5 | 3.94 | 114.2 | 4.02 |
| 593 | 121.0 | 4.40 | 122.3 | 4.63 |

The vacuum residue oil has a very high viscosity at room temperature and is generally present in a solid state in which no flow occurs. When high-pressure hydrogen is added thereto, an infinitesimal amount of hydrogen is dissolved, and a detectable amount of dissolved hydrogen is generated at a temperature of about 80° C. at which the vacuum residue oil has flowability.

According to the measurement results of hydrogen solubility in Table 6, it can be confirmed that hydrogen solubility is greatly influenced by the increase of temperature and pressure. When an amphiphilic material is added, the hydrogen solubility is observed to be slightly lower at a temperature of 180° C. or below. It is thought that this is because the dispersion of asphaltenes, which have a polarity, is induced and thereby the degree of distribution of particles having a polarity within the raw materials is raised and the repulsive force of the non-polar hydrogen on the oil increases.

In contrast, at a temperature higher than 180° C., when an amphiphilic material is added, hydrogen solubility is measured to be higher. This may be thought that the interaction between non-polar functional groups of non-polar molecules and additives may be higher in a temperature range with relatively active kinetic energy, and thereby the mass transfer of hydrogen may be facilitated.

<Dispersibility of Asphaltenes in Raw Materials>

The dispersibility of asphaltenes in the heavy oil, which were prepared according to Experimental Examples, was measured according to Experimental Example 11, and the calculated separability numbers are shown in Table 7 below. With regard to some of the raw materials to which an amphiphilic material was added, the degree of dispersion was measured without mixing an organometallic precursor so as to observe the direct effect of the materials.

ASTM D7061-04 is a method for optically measuring the dispersibility of asphaltene molecules according to coagulation and sedimentation within the oil after adding n-heptane (non-polar solvent) to a fuel oil dissolved in a polar solvent. The separability number to be obtained according to the measurement method and calculation method described in Experimental Example 11 above can be utilized as a criterion of stability for sedimentation or deposition of asphaltenes during the storage of fuel oils, and each can be classified based on the following standard.

0<S<5: oil (High stability)
5<S<10: oil (Medium stability)
S>10: oil (Low stability)

According to the above standards, the vacuum residue oils used in the present invention have the separability number (S=4.76) that corresponds to the high value within the high stability of the oil. Meanwhile, in the SDA pitch where asphaltenes are highly concentrated (prepared according to Experimental Example 8) showed a very high separability number of 15 or higher and thus it belongs to the oil with low stability.

TABLE 7

Raw materials determined from ASTM D7061-04 and separability number of asphaltenes in additive mixture

| Raw Material | Amount of amphiphilic material added | Metal Precursor and Amount Added | Separability Index |
|---|---|---|---|
| VR | — | — | 4.76 |
| VR | — | Mo-octoate (Mo = 1,000 ppm) | 1.31 |
| VR | — | Mo(CO)$_6$ (Mo = 1,000 ppm) | 4.81 |
| nC7 pitch | — | — | 15.08 |
| nC7 pitch | PIB SI 0.5 wt % | — | 0.03 |
| VR | PIB SI 0.5 wt % | Mo-octoate (Mo = 1,000 ppm) | 0.05 |
| VR | PIB SI 0.5 wt % | Mo(CO)$_6$ (Mo = 1,000 ppm) | 0.04 |
| VR | PIB SI 0.1 wt % | — | 0.17 |
| VR | PIB SI 0.3 wt % | — | 0.12 |
| VR | PIB SI 0.5 wt % | — | 0.09 |
| VR | PIB SI 0.7 wt % | — | 0.05 |
| VR | PIB SI 1.0 wt % | — | 0.01 |
| VR | PIB SI 5.0 wt % | — | 0.05 |
| VR | PIB Ph 0.5 wt % | — | 0.18 |
| VR | Poly-Acryl 0.5 wt % | — | 2.06 |
| VR | SPAN ®80 0.5 wt % | — | 3.99 |
| VR | TWEEN ®80 0.5 wt % | — | 3.75 |

The present invention aims at confirming the effect of adding an amphiphilic material that induces high dispersibility of asphaltenes within raw materials in a hydrocracking reaction, the standard for interpretation according to the above criteria are not appropriate.

Accordingly, in the present invention, the separability number value (within the range of oil with high stability) obtained by adding an amphiphilic material to vacuum residue oils (i.e., raw material) are set as the standard, and the effect of asphaltene dispersion will be explained from the amount of detailed variation in a lower range. When it is not designed as a lipophilic dispersion catalyst, that is, when only the molybdenum hexacarbonyl (i.e., a general precursor) is added in a certain amount, it can be seen that the asphaltene dispersion effect is similar or reversed.

In contrast, in the case of Mo-octoate which is designed as a lipophilic dispersion catalyst, it can be confirmed that there is a partial effect of asphaltene dispersion. However, the effect is extremely small compared to when a small amount of an amphiphilic material (e.g., polyisobutylene succinimide), which has a dramatic effect on asphaltene dispersion, is added.

An amphiphilic material does not show a simply proportional decrease of separability number according to on the amount of addition, it can be seen that the optimum amount of injection for the dispersion degree of asphaltenes (e.g., 1% in a weight ratio in the case of polyisobutylene succinimide) is present.

With regard to the effect of an amphiphilic material on asphaltene dispersion, there was a direct correlation with the dipole moment values of polar functional groups presented in Table 2, and the effect was clearly distinguished only for materials with a dipole moment greater than or equal to 1.1 Debye (D). For example, the raw materials where an amphiphilic material or SPAWN or TWEEN® 80 (i.e., the form where a polar functional group is a furan ring or sorbitan ester) having a dipole moment of less than or equal to 1.1 Debye (D) was added, the separability number was not significantly reduced.

Meanwhile, when a small amount of polyisobutylene succinimide (0.5% in a weight ratio relative to raw materials), which has the most excellent effect, was added to a highly-concentrated raw material of asphaltenes (nC7 pitch) and measured, the dispersion effect of asphaltenes was shown to be distinct (i.e., the separability number by the addition of an amphiphilic material changes from 15.08 to 0.03).

Figure 2:
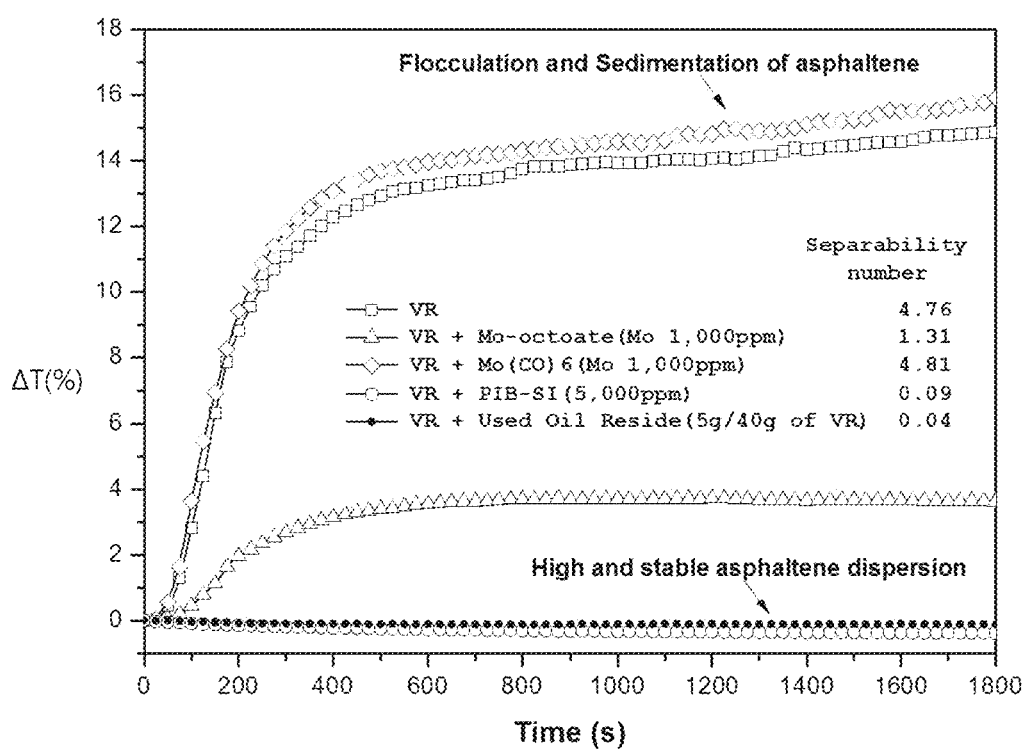
FIG. 2 illustrates the changes in relative dispersion of asphaltenes from the permeability observed over time using a heavy oil dissolution sample prepared according to ASTM D7061-04 by the spectroscopic method.

FIG. 2 shows a graph illustrating the changes in relative degree of dispersion of asphaltenes in the raw materials, by measuring via the spectroscopic method up to 30 minutes using the heavy oil dissolving sample prepared according to ASTM D7061-04. As n-heptane (i.e., a non-polar solvent) is added as a raw material, coalescence or flocculation or sedimentation can occur between asphaltenes and the changes in permeability over time are largely observed, as the molecular content of asphaltenes with a relatively higher polarity becomes greater or the asphaltene dispersion becomes less effective. When measured using only vacuum residue oil (VR) as a raw material, the large changes in permeability over time are observed. When molybdenum hexacarbonyl (a general precursor) is added in a certain amount, it can be seen that the changes in permeability are observed similarly as when only the raw material was used, but it can be also seen that Mo-octoate, which was designed with a lipophilic precursor, shows a partial decrease in permeability over time. In contrast, when polyisobutylene succinimide (an amphiphilic material) was added in a small amount (0.5% in a weight ratio), the changes in permeability were observed to be very low and constant. When the distilled residue of waste oil (5 g), which is expected that an amphiphilic material is concentrated in a large amount, with the vacuum residue oil (40 g), a stable dispersion behavior similar to when an amphiphilic material was added was shown. This suggests that the addition of an amphiphilic material exhibits a significant influence on the dispersion of asphaltenes within the raw material.

Figure 3:
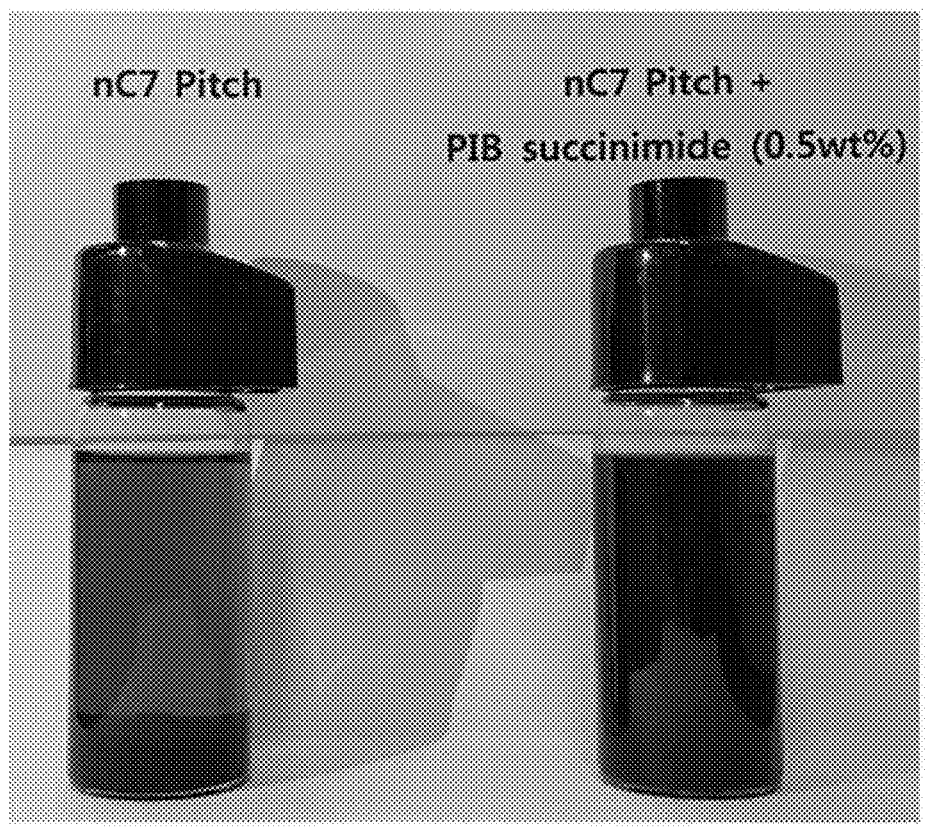
FIG. 3 illustrates the dispersibility of asphaltenes according to the presence of an amphiphilic material.

FIG. 3 shows a photographed image where a sample where an amphiphilic material is not added to nC7 pitch and a sample where an amphiphilic material is added to nC7 pitch were prepared the same as the Turbiscan (ASTM D7061-04) measurement time (stabilization for 15 minutes). These samples were prepared under the same conditions except the amphiphilic material. It was apparently confirmed by the visual observation that when an amphiphilic material was not added, the sedimentation of asphaltenes was distinctively shown, whereas when an amphiphilic material was added, no sedimentation occurred.

<Results of Hydrocracking Reaction of Heavy Oil According to Dispersion of Asphaltenes—No Addition of Catalyst>

TABLE 8

Effects of thermal cracking reaction of heavy oil according to addition of amphiphilic material

| Classification | Comparative Example 1 | Example 1 |
|---|---|---|
| Amount of amphiphilic material added (wt %) | 0 | 0.5 |
| Gas product (%) | 9.7 | 8.6 |
| Liquid Product (%) | 69.7 | 76.1 |
| Naphtha (IBP-177° C.) | 13.2 | 12.3 |
| Middle distillate (177-343° C.) | 23.3 | 24.2 |
| Gas oil (343-524° C.) | 21.0 | 25.1 |
| Residue (524° C.-FBP) | 12.3 | 14.5 |
| Toluene Insoluble (%) | 20.6 | 15.3 |
| Liquid Yield (%)$^a$ | 57.5 | 61.6 |
| Conversion (%)$^b$ | 87.7 | 85.5 |
| H$_2$ Consumption (wt %) | 0.94 | 0.93 |

$^a$100%-Gas product(%)-Residue(%)-Toluene insoluble(%)
$^b$100%-Residue(%)

In a hydrocracking reaction process where no catalyst is present, the energy applied to the reaction process induces hydrocracking of macromolecules within the heavy oil thereby producing relatively small fractions, and they can be applied to the production of light oil having a limited yield.

Heavy oil contain a plurality of unsaturated hydrocarbons and thus an effective control of heavy oil against growth and development into coke becomes difficult unless a catalyst effective for hydrogenation reaction is used. Asphaltenes, which are macromolecules, have a low hydrogen/carbon (H/C) composition ratio, and coke production may be aggravated in a hydrocracking reaction when the oil content is increased or when these molecules are present in coagulated form.

Table 8 shows the comparison results of distribution of reaction products and their performances in a hydrocracking reaction under the same conditions in the absence of a catalyst with respect to cases where polyisobutylene succinimide (an amphiphilic material) is added (Example 1) and polyisobutylene succinimide (an amphiphilic material) is not added (Comparative Example 1). According to the results of Comparative Example 1, where the sample was simply exposed to thermal cracking without applying a hydrogenation catalyst, the amount of toluene insoluble that represents coke is produced in a high mass ratio of 20% or higher, and a gas product corresponding to 10% is generated. Accordingly, there is a limit on yields with regard to liquid products (naphtha, middle distillate, and gas oil).

Example 1 shows the results where a hydrocracking reaction was performed by adding an amphiphilic material to the extent that its decomposition does not significantly affect the total composition of the reactants (0.5% in a weight ratio). Comparing the two cases, the amount of hydrogen consumption was shown to be similar to each other, and this suggests that the addition of an amphiphilic material in the absence of a hydrogenation catalyst has an insignificant effect on the changes in the hydrogenation reaction.

However, referring to the case where an amphiphilic material was added, the amount of coke production was significantly reduced by 5% or greater in a weight ratio. Meanwhile, it was confirmed that the conversion rate was slightly reduced according to the addition of an amphiphilic material, whereas the yield of liquid products increased to the contrary. These results can be interpreted that when asphaltenes within the raw material are exposed to a hydrocracking reaction after dispersing them into a size smaller than the coagulated form, the production of coke with a relatively faster reaction speed at the initial stage of the reaction is partially inhibited and thermal cracking of a larger amount of heavy molecules are proceeded and thereby the amount of lightened molecules is increased.

<Results of Hydrocracking Reaction of Heavy Oil According to Dispersion of Asphaltenes—Addition of Metal Precursor>

TABLE 9

Effect of hydrocracking reaction of heavy oil in the presence of Mo-based catalyst according to the addition of amphiphilic material

| Classification | Comp. Ex. 2 | Comp. Ex. 3 | Ex. 2 | Ex. 3 | Comp. Ex. 4 | Comp. Ex. 5 | Ex. 5 | Ex. 6 |
|---|---|---|---|---|---|---|---|---|
| Catalyst Type | Mo-octoate | | | | Mo(CO)$_6$ | | | |
| Mo Content of Catalyst (ppm) | 250 | 1,000 | 250 | 1,000 | 250 | 1,000 | 250 | 1,000 |
| Amount of amphiphilic material added (wt %) | 0 | 0 | 0.5 | 0.5 | 0 | 0 | 0.5 | 0.5 |
| Gas product (%) | 6.1 | 7.1 | 6.3 | 6.3 | 6.9 | 6.9 | 6.2 | 6.5 |

TABLE 9-continued

Effect of hydrocracking reaction of heavy oil in the presence of Mo-based catalyst according to the addition of amphiphilic material

| Classification | Comp. Ex. 2 | Comp. Ex. 3 | Ex. 2 | Ex. 3 | Comp. Ex. 4 | Comp. Ex. 5 | Ex. 5 | Ex. 6 |
|---|---|---|---|---|---|---|---|---|
| Liquid Product (%) | 90.2 | 90.4 | 90.7 | 92.7 | 88.7 | 91.4 | 90.3 | 92.6 |
| Naphtha (IBP-177° C.) | 13.7 | 10.7 | 9.9 | 7.8 | 10.3 | 5.0 | 10.4 | 5.4 |
| Middle distillate (177-343° C.) | 28.0 | 15.0 | 25.4 | 22.7 | 23.9 | 20.4 | 24.7 | 21.1 |
| Gas oil (343-524° C.) | 37.3 | 36.0 | 35.7 | 38.9 | 34.4 | 39.9 | 35.4 | 39.9 |
| Residue (524° C.-FBP) | 11.1 | 28.7 | 19.6 | 23.2 | 20.1 | 26.1 | 19.7 | 26.1 |
| Toluene insoluble (%) | 3.8 | 2.5 | 3.1 | 1.0 | 4.4 | 1.7 | 3.5 | 1.0 |
| Liquid Yield (%)$^a$ | 79.0 | 61.7 | 71.0 | 69.4 | 68.6 | 65.3 | 70.5 | 66.4 |
| Conversion (%)$^b$ | 88.9 | 71.3 | 80.4 | 76.8 | 79.9 | 73.9 | 80.3 | 73.9 |
| H$_2$ consumption (wt %) | 1.73 | 1.96 | 1.63 | 1.77 | 1.61 | 1.71 | 1.61 | 1.81 |

$^a$100%-Gas product (%)-Residue (%)-Toluene insoluble (%)
$^b$100%-Residue (%)

Table 9 shows the comparison results of distribution of reaction products in a hydrocracking reaction in the presence/absence of an amphiphilic material in applying a catalyst where Mo-octoate (an organometallic precursor) or molybdenum hexacarbonyl (a general precursor) is contained, and their performances.

In the case of Comparative Example 2 where the reaction was performed by adjusting the Mo-octoate (a lipophilic metal precursor) to 250 ppm, a high conversion rate of 88.9% was shown 2 hours after the reaction started. This suggests that the reaction proceeded at a relatively high rate and thus the yield of the liquid product was also as high as 79.0%. However, it can be seen that the yield of coke corresponding to a by-product reached 3.8%. The coke produced at a rapid reaction rate at the initial stage of the reaction corresponds to an irreversible by-product that cannot be converted to a light product, and it may be being immersed in a unit process or a transfer pipe thereby becoming a serious obstacle to long-term and stable operation of the process.

According to the reaction results of Example 2 where an amphiphilic material was added under the same conditions, it can be seen that the conversion rate or yield of the reaction is lowered, whereas the rate of relative coke production rate is maintained at a low rate. Referring to cases where the amount of addition of the same precursor was adjusted to the standard of 1,000 ppm (Comparative Example 3 and Example 3), it can be seen that as the amount of the metal precursor added is increased, the amount of coke produced is significantly reduced as expected. In particular, it can be seen that when an amphiphilic material is added thereto, only a very small amount of coke is produced at 1.0% or less, whereas the conversion rate and yield of the reaction are also improved.

Meanwhile, when the molybdenum hexacarbonyl, which is a general precursor not complying with the preparation method of organometal synthesis, was adjusted to be in a small amount to the standard of 250 ppm and applied to a hydrocracking reaction (Comparative Example 4), it was observed that the conversion rate and product yield were lower and coke production was higher, than when Mo-octoate was applied under the same metal composition (Comparative Example 2). It was confirmed that when an amphiphilic material is applied in the same amount similarly as in previous embodiments related to Mo-octoate (Examples 5 and 6), the conversion rate, yield, and reduction rate of coke were simultaneously improved compared to when an amphiphilic material was not added (Comparative Examples 4 and 5). Meanwhile, in using Mo-octoate and molybdenum hexacarbonyl, respectively, when the standard of the amount of molybdenum added is 1,000 ppm and the amphiphilic material is added in the same manner, there was a slight different in conversion rate and yield, but coke was able to be adjusted to a similar amount of production within 1%.

TABLE 10

Evaluation of reaction performance of 4-hour hydrocracking reaction in the presence of an amphiphilic material and Mo-based catalyst

| Classification | Example 4 | Example 7 |
|---|---|---|
| Catalyst Type | Mo-octoate | Mo(CO)$_6$ |
| Mo Content of Catalyst (ppm) | 1,000 | 1,000 |
| Amount of amphiphilic material added (wt %) | 0.5 | 0.5 |
| Gas product (%) | 8.1 | 8.7 |
| Liquid Product (%) | 88.8 | 88.4 |
| Naphtha (IBP-177° C.) | 19.3 | 18.3 |
| Middle distillate (177-343° C.) | 33.0 | 32.4 |
| Gas oil (343-524° C.) | 27.3 | 28.7 |
| Residue (524° C.-FBP) | 9.2 | 8.9 |
| Toluene insoluble (%) | 3.1 | 3.0 |
| Liquid Yield (%)$^a$ | 79.6 | 79.5 |
| Conversion (%)$^b$ | 90.8 | 91.1 |
| H$_2$ consumption (wt %) | 2.24 | 2.24 |

$^a$100%-Gas product(%)-Residue(%)-Toluene insoluble(%)
$^b$100%-Residue(%)

Table 10 shows the results of distribution of reaction products in a hydrocracking reaction, according to the level of progress of a hydrogenation reaction with a relatively slow rate, where Mo-octoate (an organometallic precursor) or molybdenum hexacarbonyl (a general precursor) was added such that the metal (molybdenum) content is applied in the same amount, and their performances.

Comparing with the results of the hydrocracking reaction performed for 2 hours under the same conditions corresponding to Example 4 and Example 7 (Example 3 and Example 6 of Table 9), the changes in the amount of coke production were not significant, whereas when exposed for a long period of time, the conversion rate and the yield of the heavy oil were significantly improved to 90% or higher and 80% level, respectively. Meanwhile, comparing the results of Example 4 and Example 7 with each other, no significant difference in performance was observed. This suggests that the addition of an amphiphilic material can uniformly maintain the performance of a hydrocracking reaction, and at the same time, can effectively inhibit the coke production at the initial stage of the reaction.

TABLE 11

Effect of hydrocracking reaction on heavy oil in the presence of a Fe-based catalyst according to the addition of amphiphilic material

| Classification | Comparative Example 6 | Example 8 |
|---|---|---|
| Catalyst Type | Fe-octoate | |
| Fe Content of Catalyst (ppm) | 1,000 | 1,000 |
| Amount of amphiphilic material added (wt %) | 0.5 | 0.5 |
| Gas product (%) | 8.1 | 8.7 |
| Liquid Product (%) | 88.8 | 88.4 |
| Naphtha (IBP-177° C.) | 19.3 | 18.3 |
| Middle distillate (177-343° C.) | 33.0 | 32.4 |
| Gas oil (343-524° C.) | 27.3 | 28.7 |
| Residue (524° C.-FBP) | 9.2 | 8.9 |
| Toluene insoluble (%) | 3.1 | 3.0 |
| Liquid Yield (%)$^a$ | 79.6 | 79.5 |
| Conversion (%)$^b$ | 90.8 | 91.1 |
| H$_2$ consumption (wt %) | 2.24 | 2.24 |

$^a$100%-Gas product(%)-Residue(%)-Toluene insoluble(%)
$^b$100%-Residue(%)

Table 11 shows the comparison results of distribution of reaction products in a hydrocracking reaction and their performances, according to the presence/absence of an amphiphilic material, in applying a catalyst where Fe-octoate, which is an organometallic precursor containing Group VIII(b) metal.

Similarly as in the results of reaction performance of the Mo-based catalyst (Table 9), the relative changes in conversion rate and yield were not distinct. However, when an amphiphilic material was added (Example 8), the amount of coke production was significantly reduced by about 5% and the amount of hydrogen consumption also increased, compared to when an amphiphilic material was not added (Comparative Example 6). This suggests that the uniform dispersion of asphaltenes can significantly inhibit the amount of coke production at the initial stage of the reaction and the hydrogenation reaction corresponding to the desired reaction pathway is further promoted.

<Changes in Performance of Hydrocracking Reaction According to the Amount of Amphiphilic Material Added>

TABLE 12

Effect of hydrocracking reaction on heavy oil according to the addition of amphiphilic material

| Classification | Example 9 | Example 10 | Example 2 | Example 11 | Example 12 |
|---|---|---|---|---|---|
| Catalyst Type | Mo-octoate | | | | |
| Mo Content of Catalyst (ppm) | 250 | | | | |
| Amount of amphiphilic material added (wt %) | 0.1 | 0.3 | 0.5 | 1.0 | 5.0 |
| Gas product (%) | 6.6 | 6.5 | 6.3 | 6.7 | 6.3 |
| Liquid Product (%) | 89.9 | 90.3 | 90.7 | 90.1 | 90.5 |
| Naphtha (IBP-177° C.) | 7.3 | 7.8 | 9.9 | 10.8 | 13..1 |
| Middle distillate (177-343° C.) | 20.3 | 21.0 | 25.4 | 25.5 | 26.3 |
| Gas oil (343-524° C.) | 38.4 | 37.9 | 35.7 | 34.9 | 34.0 |
| Residue (524° C.-FBP) | 23.8 | 23.6 | 19.6 | 18.9 | 17.1 |
| Toluene insoluble (%) | 3.5 | 3.2 | 3.1 | 3.2 | 3.2 |
| Liquid Yield (%)$^a$ | 66.0 | 66.7 | 71.0 | 71.2 | 73.4 |
| Conversion (%)$^b$ | 76.2 | 76.4 | 80.4 | 81.1 | 82.9 |
| H$_2$ consumption (wt %) | 1.67 | 1.66 | 1.63 | 1.65 | 1.68 |

$^a$100%-Gas product(%)-Residue(%)-Toluene insoluble(%)
$^b$100%-Residue(%)

Table 12 shows the comparison results of distribution of reaction products and their performances in a hydrocracking reaction where Mo-octoate (an organometallic precursor) as a catalyst was added in a fixed amount and the amount of an amphiphilic material added was varied. When the amount of an amphiphilic material added was increased, the conversion rate and the yield of the liquid product were increased while the amount of coke production was decreased, whereas when the amphiphilic material was added to 0.5% or higher in a weight ratio, no significant change in the amount was observed.

This suggests that there is an upper limit of the amphiphilic material necessary for the dispersion of asphaltenes, and when it is supplied in an excess amount to be greater than 5% in a weight ratio relative to the feed to be treated in applying to the process, it may result in the change of the product performance and the economic efficiency as an additive may not be guaranteed. Accordingly, it may be preferred that a minimum amount of an amphiphilic material that can maximize the effect of the dispersion of asphaltenes be added, and this may be preferably determined within the range of 0.01% to 5.0% in a weight ratio relative to the feed.

<Influence According to Type of Amphiphilic Material>

TABLE 13

Effect of hydrocracking reaction according to type of amphiphilic material

| Classification | Comparative Example 7 | Comparative Example 8 | Example 2 | Example 13 | Example 14 |
|---|---|---|---|---|---|
| Catalyst Type | Mo-octoate | | | | |
| Mo Content of Catalyst (ppm) | 250 | | | | |

TABLE 13-continued

Effect of hydrocracking reaction according to type of amphiphilic material

| Classification | Comparative Example 7 | Comparative Example 8 | Example 2 | Example 13 | Example 14 |
|---|---|---|---|---|---|
| Type of amphiphilic material | SPAN® 80 | TWEEN® 80 | PIB SI | PIB Ph | Poly-Aryl |
| Amount of amphiphilic material added (wt %) | 0.5 | 0.5 | 0.5 | 0.5 | 0.5 |
| Gas product (%) | 6.5 | 6.4 | 6.3 | 6.5 | 6.4 |
| Liquid Product (%) | 89.7 | 89.6 | 90.7 | 90.5 | 90.2 |
| Naphtha (IBP-177° C.) | 12.2 | 12.4 | 9.9 | 12.3 | 12.3 |
| Middle distillate (177-343° C.) | 25.8 | 23.9 | 25.4 | 25.3 | 26.5 |
| Gas oil (343-524° C.) | 34.9 | 37.8 | 35.7 | 35.1 | 34.4 |
| Residue (524° C.-FBP) | 16.8 | 15.5 | 19.6 | 17.8 | 17.1 |
| Toluene insoluble (%) | 3.7 | 4.0 | 3.1 | 3.0 | 3.4 |
| Liquid Yield (%)$^a$ | 73.0 | 74.2 | 71.0 | 72.7 | 73.2 |
| Conversion (%)$^b$ | 83.2 | 84.5 | 80.4 | 82.2 | 82.9 |
| H$_2$ consumption (wt %) | 1.56 | 1.58 | 1.63 | 1.60 | 1.60 |

$^a$100%-Gas product(%)-Residue(%)-Toluene insoluble(%)
$^b$100%-Residue(%)

Table 13 shows the comparison results of distribution of reaction products and their performances in a hydrocracking reaction, where Mo-octoate (an organometallic precursor) as a catalyst was added in a fixed amount and the type of an amphiphilic material added was varied.

As presented in Table 2 above, the material where a polar functional group has a dipole moment greater than or equal to 1.1 Debye (D) showed an effect of inhibiting coke production. However, when SPAN® 80 or TWEEN® 80 (a polar functional group is a furan ring or in the form of sorbitan ester) having a less than 1.1 Debye (D), the inhibition of coke production was shown to be insignificant.

Meanwhile, referring to the relative hydrogen consumption to infer hydrogenation reactivity, in the cases of Comparative Examples 7 and 8 where the effect of asphaltene dispersion was not high, it can be predicted that the reaction was not effectively proceeded.

<Effect of Dispersant with Regard to Hydrocracking Reaction of Raw Materials where Asphaltenes are Highly Concentrated by Pretreatment Process>

Heavy oil means oil with a specific gravity less than or equal to 22° of API standard, and particularly, that which is heavier than water (API≤10°) is classified as super heavy oil. Super heavy oil also means a source with high specific gravity and high viscosity, which has been difficult to dig up in the past due to the depletion of common crude oil (such as bitumen separated from oil sands, etc.). It is difficult to transport and refine them let alone the production. Meanwhile, as the fossil resources are depleted, the average supply of crude oil is becoming increasingly heavy. Therefore, residue oils discharged from refineries are gradually becoming heavy. The heavier residual oils contain a relatively large amount of non-degradable residual carbon and also have a very high content of asphaltenes. The pitch produced by the SDA process, a technology that complies with the carbon rejection method, is one of raw materials for the super heavy material where asphaltenes are highly concentrated.

TABLE 14

Effect of hydrocracking reaction of nC7 pitch according to addition of amphiphilic material

| Classification | Comparative Example 9 | Example 15 |
|---|---|---|
| Catalyst Type | Mo-octoate | |
| Mo Content of Catalyst (ppm) | 1,000 | |
| Amount of amphiphilic material added (wt %) | 0 | 0.5 |
| Gas product (%) | 10.2 | 9.4 |
| Liquid Product (%) | 73.2 | 82.1 |
| Naphtha (IBP-177° C.) | 6.2 | 8.3 |
| Middle distillate (177-343° C.) | 16.6 | 19.8 |
| Gas oil (343-524° C.) | 27.7 | 28.4 |
| Residue (524° C.-FBP) | 22.7 | 25.6 |
| Toluene insoluble (%) | 16.6 | 8.5 |
| Liquid Yield (%)$^a$ | 50.4 | 56.5 |
| Conversion (%)$^b$ | 77.3 | 74.4 |
| H$_2$ consumption (wt %) | 2.21 | 2.34 |

$^a$100%-Gas product(%)-Residue(%)-Toluene insoluble(%)
$^b$100%-Residue(%)

Table 14 shows the comparison results of distribution of products and their performances in a hydrocracking reaction, according to the presence/absence of an amphiphilic material, where pitch (nC7) separated using n-heptane was used as a raw material of the hydrocracking reaction.

Since asphaltenes are highly concentrated within the nC7 pitch, a dramatic effect on the effect of asphaltene dispersion and the performance in a hydrocracking reaction can be expected by the addition of an amphiphilic material. Referring to the results of the hydrocracking reaction, the amount of coke production in a case where an amphiphilic material was added (Example 15) was reduced by about a half compared to a case where an amphiphilic material was not added (Comparative Example 9).

Meanwhile, the yield of light liquid products (particularly, naphtha and middle distillate) was shown to significantly increase, and this suggests that the enhancement of degree of asphaltene dispersion can improve the performances of a hydrocracking reaction.

Experiment 2: Confirmation of Effect of Hydrogenolysis Catalyst Obtained from Waste Oil Experimental Example 15: Preparation of Hydrocracking Reaction Catalyst from Waste Oil From the purification process of waste oil according to FIG. 1, the impurities separated stream 30 was purified, and a liquefied hydrocarbon oil stream 41 and a distillation residue oil stream 50 were obtained by a distillation process. The waste oil was obtained from three different refining companies, where the impurity removal processes and the recovery site were different, and separated. The waste oil 1 was prepared according to the physical filtration method using a filter to remove the solids before the distillation step; the waste oil 2 was prepared by centrifugation; and the waste oil 3 was prepared by introducing sulfuric acid (a coagulant) to induce salt precipitation and removing sludge containing salts precipitated using a decanter. The water can be removed through a cryogenic distillator maintained below 240° C. The waste oil from which the impurities were removed was heated at 240° C. at a rate of 10° C. per minute to reach the boiling point of 590° C., separation was performed so that the liquefied hydrocarbon oils and distillation residue oils were 80% to 90% and 10% to 20% in a weight ratio, respectively, based on the mass of the purified waste oil added. From waste oils 1 to 3, the residues obtained in the bottom stream through the distillation process were collected and prepared as Samples 1 to 3, and the distillates obtained from the upper stream were collected and prepared as Samples 4 to 6, respectively. These samples were analyzed with regard to the components of the elements and their respective contents as follows: elemental analysis (Model: Thermo Scientific Flash 2000, detector: Thermal Conductivity Detector), X-ray fluorescence analysis (Model: Thermo/ARL QUANT'X), inductively coupled plasma-atomic emission spectrometry (ICP-AES; Model: Thermo Fisher Scientific iCAP 6500Duo) were used; boiling point distribution by ASTM D7169 (GC-Simdis) method; and non-degradable carbon residue (Conradson carbon residue; CCR) by ASTM D189.

TABLE 15

Content of elements in separated products of waste oil by elemental analysis (%)

| Element | Residue of distillation (Residue in bottom) | | | Liquefied hydrocarbon fraction (Distilled fraction in tower top) | | |
|---|---|---|---|---|---|---|
| | Sample 1 | Sample 2 | Sample 3 | Sample 4 | Sample 5 | Sample 6 |
| C | 79.5 | 81 | 79.5 | 85.3 | 85.5 | 85.3 |
| H | 12.1 | 12.6 | 12.1 | 13.7 | 13.9 | 13.7 |
| O | 3.2 | 1.6 | 2.1 | — | — | — |
| N | 0.47 | 0.19 | 0.27 | — | — | — |
| S | 0.94 | 0.58 | 0.91 | 0.08 | 0.05 | 0.08 |
| Others | 3.79 | 4.03 | 5.12 | 0.92 | 0.55 | 0.92 |

Referring to Table 15, it was confirmed that when the waste oil where the impurities were purified was distilled, each of the separated products obtained from the top of the tower and the bottom of the tower had a similar distribution of organic elements (C, H, O, N, and S). The boiling point distributions of the tower top distillate and the bottom residue obtained from Sample 1 were analyzed according to ASTM D7169 method, respectively, and the results are shown in Table 16 below.

TABLE 16

Boiling point distribution of separated products of waste oil (Samples 1 and 4) by ASTM D7169

| Sample 1 | | Sample 4 | |
|---|---|---|---|
| Boiling Point (° C.) | Mass % | Boiling Point (° C.) | Mass % |
| 192.1 | IBP | 231.8 | IBP |
| 200.0 | 0.53 | 250.0 | 0.67 |
| 250.0 | 0.59 | 300.0 | 1.90 |
| 300.0 | 0.61 | 350.0 | 6.14 |
| 350.0 | 0.66 | 400.0 | 25.94 |
| 400.0 | 0.94 | 450.0 | 66.85 |
| 450.0 | 2.72 | 500.0 | 91.90 |
| 500.0 | 11.28 | 550.0 | 98.70 |
| 550.0 | 47.18 | 585.1 | FBP |
| 600.0 | 77.99 | | |
| 650.0 | 93.79 | | |
| 700.0 | 99.36 | | |
| 702.8 | FBP | | |

IBP: initial boiling point
FBP: final boiling point

Referring to the distribution of boiling point, the tower top distillate had a relatively narrow distribution of boiling point (230° C. to 585° C.) and the bottom residue had a relatively high and wide region of distribution of boiling point (190° C. to 700° C.). In particular, it was confirmed that the bottom residue was comprised of a large amount of hydrocarbon compounds corresponding to a boiling point of 500° C. or higher, similar to that of raw materials of heavy oil (e.g., vacuum residue oil) that can be used as the raw material of a hydrocracking reaction. Most of the hydrocarbon compounds in the waste oil start with the base oil component of the oil before use, and the changes in boiling point may not be large since it is maintained as a physicochemically stable hydrocarbon structure during use. The base oil is a high boiling point oil (residue gas oil) obtained from crude oil, colorless transparent mineral oil or synthetic oil (e.g., PAO (poly-α-olefin), polyol ester, wax cracking hydrocarbon, etc.), which is obtained by a purification process (e.g., hydrogenation process, etc.) to remove an unsaturated double bond or cyclic compound, followed by an isomerization reaction, are used. Accordingly, when part of the distillation residue is mixed with the raw material in a hydrocracking reaction performed under high temperature and high hydrogen partial pressure conditions, it may not have a great influence on non-ideal behaviors (e.g., increase of partial pressure due to decomposed light gas, change in reaction heat, increase of hydrogen consumption, etc.). However, the amount of the non-degradable carbon residue within the distillation residue can lead to the change in the distribution of final product of a hydrocracking reaction, in particular the amount of coke production. Coke is composed of large amounts of carbon and some hydrogens, and is a major by-product of a hydrocracking reaction which is no longer decomposed into light components. The production of coke not only lowers the yield of the reaction, may be deposited on the walls of a unit process (a hydrocracking reaction, separation process, transfer pipe, etc.), which can cause serious operational problems in the process. Table 17 shows the measurement results of the amount of non-degradable carbon residues with regard to distillation residues.

TABLE 17

Amount of non-degradable carbon residues with regard to distillation residues of waste oil

|  | Sample 1 | Sample 2 | Sample 3 |
|---|---|---|---|
| CCR (%) | 9.8 | 7.1 | 13.4 |

Meanwhile, X-ray fluorescence analysis was performed on distillation residues to observe the kinds of inorganic constituents including transition metals active in a hydrocracking reaction, and the relative content of the detected components is shown in Table 18 below.

TABLE 18

Relative contents of metal elements in distillation residues of waste oil by X-ray fluorescence analysis

| Element | Sample 1 | Sample 2 | Sample 3 |
|---|---|---|---|
| Na | 17.2 | 22.6 | 0.0 |
| Mg | 1.5 | 0.0 | 0.0 |
| Al | 0.4 | 0.0 | 0.0 |
| P | 7.7 | 7.9 | 2.1 |
| S | 20.2 | 18.2 | 6.3 |
| Cl | 1.6 | 4.9 | 9.1 |
| K | 2.9 | 2.0 | 3.8 |
| Ca | 27.2 | 26.0 | 38.8 |
| Fe | 2.5 | 2.2 | 4.4 |
| Cu | 0.6 | 0.5 | 1.8 |
| Zn | 16.7 | 14.6 | 30.4 |
| Br | 0.3 | 0.2 | 0.2 |
| Mo | 1.4 | 1.1 | 3.0 |

Referring to Table 18, various kinds of cations (Na, Mg, K, and Ca) due to additives of a lubricating oil such as dispersant are contained in large amounts. Meanwhile, transition metals (e.g., molybdenum, copper, iron, and zinc), and may be present being uniformly dispersed in those derived from organometallic additives effective in a hydrocracking reaction (e.g., sulfides, phosphides, and halides). These concentrated metals in the residues were quantified by ICP-AES analysis and the determined contents are shown in Table 19 below.

TABLE 19

Contents of metals in distillation residues of waste oil determined by ICP-AES

| Element | Sample 1 | Sample 2 | Sample 3 |
|---|---|---|---|
| Mo | 480 | 130 | 650 |
| Cu | 183 | 570 | 460 |
| Fe | 902 | 310 | 1,100 |
| Zn | 5,300 | 3,500 | 6,800 |

Referring to Table 19, the composition ratios of the prepared distillation residue samples are similar, it can be seen that there is a slight difference in the absolute contents depending on the removal process of the impurities. In the case of Sample 2, the content of overall transition metals were low, but the content of copper was somewhat high.

TABLE 20

Separability number of asphaltenes according to the mixing of raw materials determined by ASTM D7061-04 and the distillation residues of waste oil

| Raw Material | Distillation residues of waste oil | Amount of distillation residues of waste oil added, g/(40 g of VR) | Separability Index |
|---|---|---|---|
| VR | Sample 1 | 5 | 0.04 |
| VR | Sample 2 | 5 | 0.02 |
| VR | Sample 3 | 5 | 0.08 |

Table 20 shows the separability number of asphaltenes in the vacuum residue oil where the distillation residues of waste oil measured according to Experimental Example 11. In the case where the amphiphilic materials shown in Table 7 were added, compared to those of the values of separability number, all of the distillation residues of waste oil were shown to have an excellent effect in inducing high dispersion of asphaltenes.

Each distillation residue (5 g) quantified by the above analysis method was prepared as a hydrocracking reaction catalyst.

Experimental Example 16: Change in Amount of Active Metals in Hydrocracking Reaction Catalyst and Pretreatment of Temperature Increase Mo-octoate (Shepherd Chemical Co.; Mo Content 15%; oxidation number 3.8), an organometallic compound, was quantified and added to the hydrocracking reaction catalyst prepared from Sample 1 according to Experimental Example 15 and thereby the amount of the active metal was changed. The mixture was stirred at 80° C. for 4 hours to prepare a hydrocracking reaction catalyst having different metal contents.

Experimental Example 17: Change in Amount of Active Metals in Hydrocracking Reaction Catalyst and Pretreatment of Temperature Increase Molybdenum hexacarbonyl ($Mo(CO)_6$), an organometallic compound, was quantified and added to the hydrocracking reaction catalyst prepared from Sample 1 according to Experimental Example 15 and thereby the amount of the active metal was changed. The mixture was stirred at 80° C. for 4 hours to prepare a hydrocracking reaction catalyst having different metal contents.

Experimental Example 18: Pretreatment of Hydrocracking Reaction Catalyst

A hydrocracking reaction catalyst was prepared in the same manner as in Experimental Example 17 except that the catalyst was exposed to sonication with the intensity of 60 Hz during the agitation process.

Experimental Example 19: Evaluation of Heavy Oil in Hydrocracking Reaction Under No Catalyst The reaction conditions were follows: initial temperature 80° C., initial pressure 80 bar, reaction temperature 430° C., reaction time 4 hours, and agitation speed 1,500 rpm. The vacuum residue oil (40 g) was added to a 250 mL batch-type reactor and reacted under the above reaction conditions, and the product was analyzed. The materials used as raw materials to be supplied for the evaluation of a hydrocracking reaction were vacuum residue oils obtained from Hyundai Oil Bank, and their characteristics are as presented in Table 21.

TABLE 21

Characteristics of vacuum residue oil

| Analysis Items | | Results |
|---|---|---|
| Element Analysis (wt %) | C | 84.1 |
| | H | 10.1 |
| | N | 0.4 |
| | S | 5.5 |
| | O | — |
| Heavy metal content (mg/kg) | Ni | 36 |
| | V | 151 |
| SARA Analysis (Area %) | S | 4 |
| | A | 47 |
| | R | 18 |
| | A | 31 |
| API | | 5.84 |
| Distillation curve | >524° C. | 82% |
| CCR | | 23.2 wt % |

S: Saturates,
A: Aromatic,
R: Resin,
A: Asphaltene

Experimental Example 20: Evaluation of Heavy Oil in Hydrocracking Reaction in the Presence of Catalyst The evaluation of heavy oil in a hydrocracking reaction was performed in the same manner as in Experimental Example 19, except that the catalysts prepared according to Experimental Examples 15 to 18 were used by mixing with the vacuum residue oil (40 g), which is the raw material of the catalyst.

Experimental Example 21: Evaluation of Hydrocracking Reaction in the Presence of Catalyst The evaluation of heavy oil in a hydrocracking reaction was performed in the same manner as in Experimental Example 20, except that the reaction time was adjusted to 2 hours.

COMPARATIVE EXAMPLES AND EXAMPLES

Comparative Example 10

A hydrocracking reaction of a vacuum residue oil was performed without applying the catalyst according to Experimental Example 19.

Comparative Example 11

A hydrocracking reaction of a vacuum residue oil was performed according to Experimental Example 20 by adding Mo-octoate such that the molybdenum content became 55 ppm relative to the vacuum residue oil, which is a raw material of the hydrocracking reaction.

Comparative Example 12

A hydrocracking reaction was performed in the same manner as in Comparative Example 11, except that Mo-octoate was added such that the molybdenum content became 250 ppm relative to the vacuum residue oil.

Comparative Example 13

A hydrocracking reaction was performed in the same manner as in Comparative Example 11, except that molybdenum hexacarbonyl was added such that the molybdenum content became 250 ppm relative to the vacuum residue oil.

Examples 16 to 18

A hydrocracking reaction was performed according to Experimental Example 20 using the hydrocracking reaction catalysts prepared from Samples 1 to 3 according to Experimental Example 15.

Example 19

A hydrocracking reaction catalyst was prepared according to Experimental Example 16, and a hydrocracking reaction was performed according to Experimental Example 20 by adjusting the molybdenum content to 250 ppm relative to the vacuum residue oil.

Example 20

A hydrocracking reaction catalyst was prepared according to Experimental Example 17, and a hydrocracking reaction was performed according to Experimental Example 20 by adjusting the molybdenum content to 250 ppm relative to the vacuum residue oil.

Example 21

A hydrocracking reaction was performed in the same manner as in Experimental Example 20, except that the molybdenum content was adjusted to 2,000 ppm relative to the vacuum residue oil.

Example 22

A hydrocracking reaction catalyst pretreated according to Experimental Example 18 was prepared, and a hydrocracking reaction was performed according to Experimental Example 20 by adjusting the molybdenum content to 55 ppm relative to the vacuum residue oil.

Example 23

A hydrocracking reaction was performed in the same manner as in Example 22, except that the molybdenum content was adjusted to 250 ppm relative to the vacuum residue oil.

Example 24

A hydrocracking reaction was performed in the same manner as in Example 22, except that the molybdenum content was adjusted to 2,000 ppm relative to the vacuum residue oil.

Example 25

A hydrocracking reaction catalyst pretreated according to Experimental Example 17 was prepared, and a hydrocracking reaction was performed according to Experimental Example 21 by adjusting the molybdenum content to 2,000 ppm relative to the vacuum residue oil.

Example 26

A hydrocracking reaction catalyst pretreated according to Experimental Example 18 was prepared, and a hydrocracking reaction was performed according to Experimental Example 21 by adjusting the molybdenum content to 2,000 ppm relative to the vacuum residue oil.

Comparative Example 14

A hydrocracking reaction was performed in the same manner as in Example 22, except that the molybdenum content was adjusted to 11,000 ppm relative to the vacuum residue oil.

Hereinafter, the conditions according to Examples and Comparative Examples are shown in Table 21 below. Examples 16 to 18 used Samples 1 to 3, respectively, and Examples 19 to Example 26 used Sample 1.

TABLE 22

Summary of preparation of catalysts and conditions of hydrocracking reaction according to Examples and Comparative Examples

| Classification | Raw Material (VR) (g) | Used Oil (g) | Mo-Octoate (Mo ppm) | $Mo(CO)_6$ (Mo ppm) | Presence of Pretreatment (Sonication @ 80° C. for 4 hr) | Total Mo contents (Mo ppm) | Reaction Time (hr) |
|---|---|---|---|---|---|---|---|
| Comparative Example 10 | 40 | 0 | 0 | 0 | X | 0 | 4 |
| Comparative Example 11 | 40 | 0 | 55 | 0 | X | 55 | 4 |
| Comparative Example 12 | 40 | 0 | 250 | 0 | X | 250 | 4 |
| Comparative Example 13 | 40 | 0 | 0 | 250 | X | 250 | 4 |
| Example 16 | 40 | 5 | 0 | 0 | X | 55 | 4 |
| Example 17 | 40 | 5 | 0 | 0 | X | 14 | 4 |
| Example 18 | 40 | 5 | 0 | 0 | X | 72 | 4 |
| Example 19 | 40 | 5 | 195 | 0 | X | 250 | 4 |
| Example 20 | 40 | 5 | 0 | 195 | X | 250 | 4 |
| Example 21 | 40 | 5 | 0 | 1,945 | X | 2,000 | 4 |
| Example 22 | 40 | 5 | 0 | 0 | ○ | 55 | 4 |
| Example 23 | 40 | 5 | 0 | 195 | ○ | 250 | 4 |
| Example 24 | 40 | 5 | 0 | 1,945 | ○ | 2,000 | 4 |
| Example 25 | 40 | 5 | 0 | 1,945 | X | 2,000 | 2 |
| Example 26 | 40 | 5 | 0 | 1,945 | ○ | 2,000 | 2 |
| Comparative Example 14 | 40 | 5 | 0 | 10,945 | ○ | 11,000 | 4 |

The vacuum residue oil, which corresponds to an example of a heavy material, is the heaviest oil obtained from the distillation process under the atmospheric pressure and reduced pressure in the crude oil refining process, and the residue components having a boiling point higher than 524° C. account for 82% or more. This is a relatively low-value raw material because it has a high viscosity and a high impurity content, it is possible to convert it to high-value liquefied light oil through thermal cracking. The high-valued liquefied light oil may be classified into naphtha, middle distillate, gas oil, etc. depending on the boiling point. Meanwhile, toluene insoluble (coke) is a byproduct which can no longer be converted to the above high-value liquid light oil along with the progress of a hydrocracking reaction proceeds, and if it is produced at a high ratio, it may cause many problems in the process. In particular, it may inactivate used catalysts, deposit in the reactor and unit process and prevent the transfer of raw materials or reaction products thus negatively affecting the normal and stable operation. Accordingly, it is desirable to design the catalyst to minimize the production of toluene insoluble or to control the amount of additives.

TABLE 23

Comparison of basic performance in hydrocracking reaction using no catalyst, Mo-octoate, and distillation residue of waste oil

| Distribution of Products | Raw Material | Comp. Ex. 10 | Comp. Ex. 11 | Comp. Ex. 12 | Ex. 16 | Ex. 17 | Ex. 18 |
|---|---|---|---|---|---|---|---|
| Gas product (%) | | 11.9 | 13.7 | 13.4 | 15.2 | 12.1 | 15.6 |
| Liquid Product (%) | 100.0 | 66.6 | 79.6 | 82.9 | 82.9 | 85.0 | 81.0 |
| Naphtha (IBP-177° C.) | | 16.8 | 16.9 | 15.6 | 12.9 | 17.7 | 20.0 |
| Middle distillate (177-343° C.) | | 25.3 | 29.3 | 30.9 | 28.4 | 32.7 | 29.3 |
| Gas oil (343-524° C.) | 18.0 | 16.0 | 23.2 | 26.8 | 28.6 | 25.3 | 23.4 |
| Residue (524° C.-FBP) | 82.0 | 8.5 | 10.1 | 9.7 | 12.8 | 9.3 | 8.2 |
| Toluene insoluble (%) | | 21.6 | 6.7 | 3.7 | 1.9 | 2.9 | 3.4 |
| Liquid Yield (%)[a] | | 58.0 | 69.4 | 73.2 | 70.0 | 75.7 | 72.8 |
| Conversion (%)[b] | | 91.5 | 89.9 | 90.3 | 87.2 | 90.7 | 91.8 |

[a] 100%-Gas product (%)-Residue (%)-Toluene insoluble (%)
[b] 100%-Residue (%)

Figure 4:
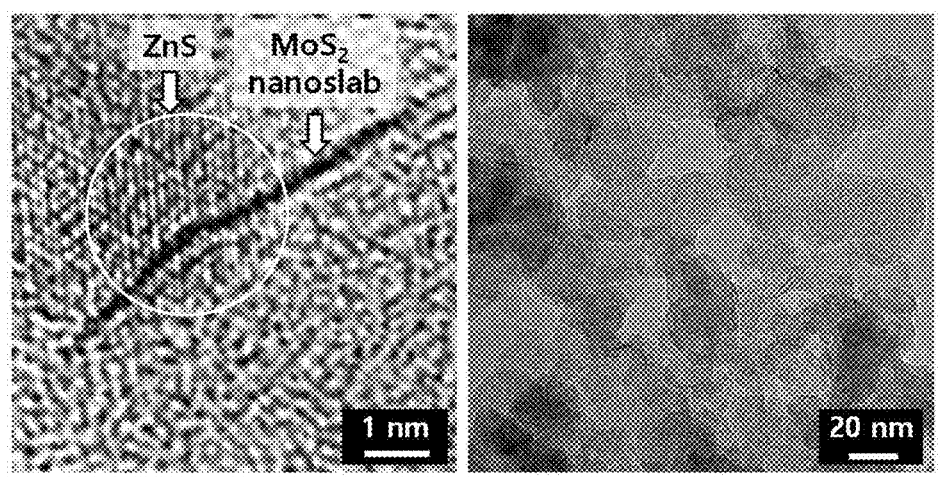
FIG. 4 illustrates the image of toluene insoluble matters collected photographed with a transmission electron microscope (TEM) after applying distillation residues prepared from waste oil to a hydrocracking reaction according to an embodiment of the present invention.

Table 23 shows the results of distribution of products according to the hydrocracking reaction of the vacuum residue oil, in a case where no catalyst was used (Comparative Example 10), a case where molybdenum was added to a concentration of 55 ppm (Comparative Example 11) and 250 ppm (Comparative Example 12), relative to that of vacuum residue oil (a raw material), and a case where the distillation residues of waste oil (5 g) was used. The distribution of boiling points of raw materials and liquid products shown in the above table was determined by ASTM D7169; the toluene insoluble was measured according to ASTM D4312; and the gas products corresponding to those having 1 to 5 carbon atoms were quantified by gas chromatography where Thermal Conductivity Detector (TCD) and Flame Ionization Detector (FID) are mounted. Referring to the results of the hydrocracking reaction (Comparative Example 1) where no catalyst was used, the amount of toluene insoluble production reached 22%, whereas the yield of liquid-phase light oil was as low as to be 58%. In contrast, when Mo-octoate (an organometallic precursor), which was disclosed in previous patents US20110139677, US20140291203, U.S. Pat. Nos. 7,670,984, 7,842,635, etc., was used at the standard concentration of 250 ppm (Comparative Example 12), the yield of liquid-phase light oil was significantly improved to 73% or higher. This is due to the fact that, after the precursor is very uniformly dispersed on the oil, it is converted to molybdenum disulfide ($MoS_2$) in a nano form, which is an active species, through in situ activation, and thereby acts as an effective hydrocracking reaction catalyst that can lower the activation energy barrier. Meanwhile, referring to the embodiment where the distillation residue of waste oil was applied (Examples 16 to 18), although the molybdenum content was merely in the range of 14 ppm to 72 ppm, the yield of the liquid-phase light oil and the amount of toluene insoluble production were comparable to that where Mo-octoate 250 ppm was applied (Comparative Example 3). Comparing the results of hydrocracking reactions where the distillation residue of waste oil was added by adjusting the applied molybdenum content was adjusted to 55 ppm (Example 16) and where Mo-octoate was added (Comparative Example 11), the yield of liquid-phase light oil was comparable, but in a case where the distillation residue of waste oil was applied, the amount of toluene insoluble production was decreased by 4.8% or more. Comparing with the results where the distillation residue of waste oil was applied to a hydrocracking reaction (Examples 16 to 18), it can be predicted that the reaction performances do not solely rely on the molybdenum content, and as shown in Table 19, the mixed forms of sulfides, phosphides, and dispersants of transition metals (e.g., zinc, iron copper, etc.) are involved in a hydrocracking reaction in combination. FIG. 4 shows Transmission Electron Microscope (TEM) images illustrating the solid-phase products corresponding to toluene insoluble among the products of hydrocracking reactions performed by adding only the distillation residue of waste oil to the raw material according to Example 16. Transition metal species were identified from energy dispersive spectroscopy (EDS). It can be seen that zinc sulfide (an active species of a hydrocracking reaction) and a nano-slab of single-layered molybdenum disulfide, which is known to have the most excellent hydrogenation activity are present, although molybdenum or other metal precursors were not added separately. This suggests that the distillation residue of waste oil, which is well prepared so that the concentration of transition metals can be adjusted according to an embodiment of the present invention, can be utilized as a catalyst for a hydrocracking reaction regardless of the further separate addition of another precursor.

TABLE 24

Comparison of performances of catalysts, where the molybdenum content was adjusted to 250 ppm relative to the vacuum residue oil, in hydrocracking reaction

| Distribution of Products | Comparative Example 12 | Comparative Example 13 | Example 19 | Example 20 |
|---|---|---|---|---|
| Gas product (%) | 13.4 | 16.4 | 19.7 | 17.8 |
| Liquid Product (%) | 82.9 | 78.6 | 78.6 | 80.5 |

TABLE 24-continued

Comparison of performances of catalysts, where the molybdenum content was adjusted to 250 ppm relative to the vacuum residue oil, in hydrocracking reaction

| Distribution of Products | Comparative Example 12 | Comparative Example 13 | Example 19 | Example 20 |
|---|---|---|---|---|
| Naphtha (IBP-177° C.) (%) | 15.6 | 15.8 | 12.3 | 13.0 |
| Middle distillate (177-343° C.) (%) | 30.9 | 29.2 | 27.1 | 27.3 |
| Gas oil (343-524° C.) (%) | 26.8 | 23.6 | 28.0 | 28.2 |
| Residue (524° C.-FBP) (%) | 9.7 | 10.1 | 11.2 | 12.1 |
| Toluene insoluble (%) | 3.7 | 5.0 | 1.7 | 1.7 |
| Liquid Yield (%)$^a$ | 73.2 | 68.5 | 67.4 | 68.4 |
| Conversion (%)$^b$ | 90.3 | 89.9 | 88.8 | 87.9 |

$^a$100%-Gas product(%)-Residue(%)-Toluene insoluble(%)
$^b$100%-Residue(%)

Table 24 shows the results comparing cases where Mo-octoate was used as an organometallic precursor (Comparative Example 12), hexacarbonyl molybdenum (a general precursor without dispersibility) was used (Comparative Example 13), and a case where the above materials were added in part to the distillation residue of waste oil, respectively, so as to adjust the molybdenum concentration to 250 ppm in a hydrocracking reaction. US 20130248422, a previous patent document, suggests changes in performances depending on various species (carboxylate anion) that are coordinated on molybdenum to design an organometallic precursor for a hydrocracking reaction. Organic compounds have the ability to improve the dispersibility of oil so as to induce effective catalytic decomposition of active transition metals with the desired heavy molecules. Hexacarbonyl molybdenum does not have a long chain of hydrocarbons and thus may have a relatively low dispersibility in oil, and therefore, it may not be uniformly dispersed in the heavy oil. Referring to the results of hydrocracking reactions in a case where Mo-octoate was added by adjusting the molybdenum concentration to 250 ppm (Comparative Example 12) and a case where hexacarbonyl molybdenum was added (Comparative Example 13), it can be seen that the Mo-octoate which was designed to improve the dispersibility in oil has excellent performance. In contrast, comparing the results of hydrocracking reactions in cases where each was added to the distillation residue of waste oil (molybdenum 55 ppm) and applied to the reaction (Examples 19 and 20), their performances were very similar to each other. These results are due to the role of the dispersant remaining in the distillation residue of waste oil, where the dispersibility of a general transition metal precursor, which was not designed to have a lipophilic property, in oil was significantly improved. Meanwhile, when molybdenum was added to the distillation residue of waste oil by a precursor, the characteristic of overcracking that the production of gas phase is increased due to excessive activity appears, and thus, the yield of liquid-phase light oil is reduced in a small scale compared to when Mo-octoate corresponding to an equal amount of molybdenum is applied.

TABLE 25

Evaluation of hydrocracking reaction according to additional concentration of general transition metal precursor

| Distribution of Products | Example 16 | Example 20 | Example 21 |
|---|---|---|---|
| Gas product (%) | 15.2 | 17.8 | 15.3 |
| Liquid Product (%) | 82.9 | 80.5 | 84.0 |
| Naphtha (IBP-177° C.) (%) | 12.9 | 13.0 | 16.0 |
| Middle distillate (177-343° C.) (%) | 28.4 | 27.3 | 27.4 |
| Gas oil (343-524° C.) (%) | 28.6 | 28.2 | 28.7 |
| Residue (524° C.-FBP) (%) | 12.8 | 12.1 | 11.9 |
| Toluene insoluble (%) | 1.9 | 1.7 | 0.8 |
| Liquid Yield (%)$^a$ | 70.0 | 68.4 | 72.0 |
| Conversion (%)$^b$ | 87.2 | 87.9 | 88.1 |

$^a$100%-Gas product(%)-Residue(%)-Toluene insoluble(%)
$^b$100%-Residue(%)

Table 25 shows the results of hydrocracking reactions in cases where hexacarbonyl molybdenum (a general precursor) was added to the distillation residue of waste oil (molybdenum content 55 ppm) to adjust the molybdenum content to 55 ppm, 250 ppm, and 2,000 ppm (Example 16, Example 20, and Example 21, respectively) and then applied to the hydrocracking reaction of the vacuum residue oil. It was confirmed that, as the molybdenum content increased, the conversion rate increased while the amount of toluene insoluble production decreased. This is because the hydrogenation activity increases as the amount of the transition metal added increases, and the radicals generated by thermal cracking are effectively inhibited from being developed into coke by hydrogen addition or capping at the terminal group. Meanwhile, when the amount of hexacarbonyl molybdenum, which was added to achieve 2,000 ppm of the molybdenum content (Example 20), the gas generation due to overcracking, that occurred in a case where hexacarbonyl molybdenum was added in a small amount to achieve 250 ppm the of the molybdenum content (Example 16), was effectively inhibited and it was possible to obtain high yield of liquid-phase light oil.

The transition metals in oil of the distillation residue of waste oil can be present in a grown form or in an undispersed form during their use and purification processes by phenomena such as coagulation, coalescence, agglomeration, sedimentation, carbonization, etc. For example, according to a previous non-patent document (Giuseppe Bellussi, Giacomo Rispoli, Alberto Landoni, Roberto Millini, Daniele Molinari, Erica Montanari, Daniele Moscotti, Paolo Pollesel/Hydroconversion of heavy residues in slurry reactors: Developments and perspectives/J. Catal./189-200/308 (2013)), molybdenum disulfide (an active species of a hydrocracking reaction) forms a stacking layer by van der waals force as it is exposed to the process for a long period of time. Except the rim of the basal site of the stacking layer, the hydrogenation reaction activity is not high and thus the growth of molybdenum disulfide can cause a significant decrease of the reaction activity. Transition metals other than molybdenum can lose their activity as a catalyst if the size of constituting crystals becomes large or is not well dispersed. According to another previous non-patent document (Millan M. Mdleleni, Taeghwan Hyeon, and Kenneth S. Suslick/Sonochemical Synthesis of Nanostructured Molybdenum Sulfide/J. Am. Chem. Soc./120/6189-6190 (1998)), the exposure to sonication during the synthesis process of molybdenum disulfide can prevent aggregation or may develop it into an exfoliated structure, and the thus prepared catalyst can have an excellent performance in the hydrogenation reaction.

Based on the results of the above references, the catalysts used in the results of Table 25 were applied to hydrocracking reactions, by subjecting them to a pretreatment process of agitation at 80° C. for 4 hours while exposing them to sonication with an intensity of 60 Hz. The results are shown in Table 26 below. The added precursor was prepared by quantification so that the molybdenum content relative to the vacuum residue oil became 55 ppm, 250 ppm, and 2,000 ppm (Example 22, Example 23, and Example 24, respectively). Comparing with the results of Table 24, where the catalyst was applied without performing pretreatment in the process of preparing the catalyst, the conversion rate and the yield of liquid-phase light oil were improved. Additionally, referring to the two cases where the catalyst was prepared using hexacarbonyl molybdenum (Example 23 and Example 24), the amount of toluene insoluble production increased slightly when the catalyst was applied after pretreatment, however, the production of gas-phase product with relatively low value was significantly reduced. Meanwhile, when the hydrocracking reaction was performed by adding a large amount of hexacarbonyl molybdenum to achieve 11,000 ppm of the molybdenum content relative to the vacuum residue oil (Comparative Example 14), no significant change in performance was observed. This suggests that the performance does not improve in proportion to the consumption of high-value molybdenum, in actual operation of the hydrocracking reaction.

TABLE 26

Evaluation of performance of hydrocracking reaction according to pretreatment

| Distribution of Products | Example 22 | Example 23 | Example 24 | Comparative Example 14 |
|---|---|---|---|---|
| Gas product (%) | 15.6 | 12.9 | 12.2 | 11.9 |
| Liquid Product (%) | 82.9 | 84.7 | 85.3 | 85.5 |
| Naphtha (IBP-177° C.) (%) | 16.2 | 18.0 | 19.5 | 19.7 |
| Middle distillate (177-343° C.) (%) | 29.4 | 28.5 | 27.8 | 27.8 |
| Gas oil (343-524° C.) (%) | 26.6 | 26.7 | 27.8 | 27.9 |
| Residue (524° C.-FBP) (%) | 10.8 | 11.5 | 10.2 | 10.1 |
| Toluene insoluble (%) | 1.6 | 2.4 | 2.5 | 2.6 |
| Liquid Yield (%)[a] | 72.1 | 73.2 | 75.1 | 75.4 |
| Conversion (%)[b] | 89.2 | 88.5 | 89.8 | 89.9 |

[a]100%-Gas product(%)-Residue(%)-Toluene insoluble(%)
[b]100%-Residue(%)

The conventional process of a hydrocracking reaction is generally designed and operated so that raw materials and reactants are continuously injected and the product has a continuous flow according to the separation process. In such a continuous process, to secure high through-put, the hydrocracking reaction unit is designed so that the raw material has a low residence time, high conversion rates in short time and yield of liquid light oil must be ensured for efficient operation. Table 26 shows the results of applying vacuum residue oil to hydrocracking reactions by not performing pretreatment after adjusting the molybdenum concentration to 2,000 ppm by adding hexacarbonyl molybdenum to the distillation residue of waste oil (Example 25 and Example 21), or by varying the reaction time of the catalyst subjected to pretreatment (Example 26 and Example 24). When the reaction time was reduced by half and performed for 2 hours, the conversion rate and the yield of liquid-phase light oil were reduced but in a small scale, whereas the amount of toluene insoluble production was significantly reduced. Meanwhile, the catalyst subjected to pretreatment showed higher conversion rates and yields of liquefied light oil, and it can be interpreted that the results of improvement are due to the improved catalyst activity.

TABLE 27

Changes in distribution of products of hydrocracking reaction according to reaction time

| Distribution of products over time | 2 Hr | | 4 Hr | |
|---|---|---|---|---|
| | Example 25 | Example 26 | Example 21 | Example 24 |
| Gas product (%) | 8.0 | 10.4 | 15.3 | 12.2 |
| Liquid Product (%) | 91.9 | 89.3 | 84.0 | 85.3 |
| Naphtha (IBP-177° C.) (%) | 10.8 | 11.2 | 16.0 | 19.5 |
| Middle distillate (177-343° C.) (%) | 22.1 | 23.9 | 27.4 | 27.8 |
| Gas oil (343-524° C.) (%) | 35.5 | 33.5 | 28.7 | 27.8 |
| Residue (524° C.-FBP) (%) | 23.6 | 20.7 | 11.9 | 10.2 |
| Toluene insoluble (%) | 0.1 | 0.3 | 0.8 | 2.5 |
| Liquid Yield (%)[a] | 68.3 | 68.6 | 72.0 | 75.1 |
| Conversion (%)[b] | 76.4 | 79.3 | 88.1 | 89.8 |

[a]100%-Gas product(%)-Residue(%)-Toluene insoluble(%)
[b]100%-Residue(%)

According to the present invention, when an amphoteric material having polar and non-polar functional groups is added to the oil, polar materials containing asphaltenes are dispersed evenly, and when the amphoteric material is applied to a hydrocracking reaction, the production of coke, which is a by-product of the reaction can be significantly inhibited, and the material transfer of hydrogen (a non-polar reactant) to a polar molecule, which is a target compound, and contact frequency can be increased thereby improving the yield of the final product.

According to the present invention, the performance of the catalyst used in the hydrocracking reaction can be significantly improved, and thus, the present invention can provide a method to significantly reduce the amount of high-value metals.

According to the present invention, asphaltenes (the major target material in a hydrocracking reaction or hydrotreating reaction) and polar materials can be dispersed thereby the performance of the reaction can be improved. Therefore, a lipophilic organometallic compound (or a catalyst precursor) can be replaced with a general metal precursor.

Accordingly, it is possible to secure economic efficiency because the process of synthesis and preparation of organometallic compounds can be omitted.

According to the present invention, since the coke produced as a reaction by-product is partially inhibited from being deposited on the inner wall of the unit process, fouling occurs less and stable operation of hydrocracking process is possible.

According to the present invention, a catalyst that converts heavy oil into light oil using the low-value separated products that occur during the purification process of waste oil, hydrocracking reaction process due to the replacement of existing expensive metal catalysts can be operated in a cost-effective manner. Concentrated metals are heavy metals harmful to humans, which can reduce environmental emissions and improve social environmental problems.

When a catalyst according to the present invention is applied to a hydrocracking reaction, it is possible to provide a method for significantly reducing the amount of expensive metal used.

According to the present invention, the clean dispersant, among the components concentrated during the purification of waste oil, can increase the dispersibility of hydrophilic metal precursors, organometallic compound precursors that require a separate synthetic preparation can be replaced or partially replaced.

The catalyst prepared according to the present invention has chemical properties being composed of high concentration heavy hydrocarbon fractions and the physical properties of API and high viscosity, which are similar to those of raw materials, and thus, it can be applied to a fixed bed reactor, an applied reactor, or a slurry bed reactor, alone or in combination with other catalysts.

According to the present invention, the clean dispersant, among the components concentrated during the purification of waste oil, can inhibit the deposition to the inner wall of a unit process of carbon solids, which can be produced as a by-product with macromolecules of metals, and fouling can be reduced and enables stable operation of hydrocracking process.

The transition metal that is concentrated during the refining process of waste oil is highly dispersed in residue oil, and thus, it can be effective in a hydrocracking reaction, and the yield of light oil can be maximized by the addition of a small amount of catalyst precursor.

The waste oil-concentrated residue of the present invention contains various kinds of elements (e.g., K, Na, Mg, Ca, Cu, Fe, Mo, Zn, S, P, Cl, Br, etc.). Therefore, it is possible that the residue may actually exist in the form of sulfides, phosphates, and halides of transition metals (Cu, Fe, Mo, and Zn) and alkaline earth metals (Na, K, Mg, and Ca), and it can be interpreted that these compounds decompose lower-grade crude oil under the conditions of a high-temperature, high-pressure hydrogen atmosphere to convert it into light oil.

In particular, it may be interpreted that sulfides and phosphates of transition metals are expected to be effective catalytic components for hydrocracking, and coexistence of these compounds, although present in a small amount, synergistically contributes to a hydrocracking reaction, becomes more effective than the contribution by each single transition metal compound.

What is claimed is:

1. A method for converting heavy oil by means of high dispersion of asphaltenes, comprising the steps of:
    preparing a mixture by mixing an amphiphilic additive and the heavy oil; and
    converting the heavy oil through performing a hydrogenation reaction on the mixture, wherein the amphiphilic additive comprises both polar and non-polar functional group,
    wherein the amphiphilic additive comprises a product obtained from a bottom stream in which waste oil is distilled;
    the method further comprises obtaining a hydrogenation reaction catalyst which comprises the bottom stream, wherein the hydrogenation reaction is performed using the hydrogenation reaction catalyst, and the waste oil comprises at least one metal component among molybdenum, iron, zinc, and copper, wherein the bottom stream comprises 50 ppm to 3,000 ppm of molybdenum and wherein the bottom stream further comprises 100 ppm to 5,000 ppm of iron, 1,000 ppm to 5,000 ppm of zinc, and 50 ppm to 5,000 ppm of copper; and
    the method further comprises mixing at least one among Group VIII(b), Group VI(b), Group 11(b), and Group I(b) transition metals, Group VI(a), Group V(a), Group VII(a), and Group IV(a) elements, and compounds comprising the same in the bottom stream, wherein the mixing is performed such that the amount of molybdenum is adjusted to be in an amount of 150 ppm to 5,000 ppm in the hydrogenation reaction catalyst and wherein sonication is applied during the mixing.

2. The method of claim 1, wherein:
    the dipole moment of the polar group is greater than or equal to 1.1 Debye (D);
    the dipole moment of the non-polar group is less than or equal to 0.5 Debye (D);
    and the net dipole moment of the amphiphilic additive is greater than or equal to 0.6 Debye (D).

3. The method of claim 2, wherein the amphiphilic additive is in the form of a polymer having a number average molecular weight of 100 to 500,000.

4. The method of claim 3, wherein the polar group comprises at least one selected from amine, imide, amide, alcohol, phenol, ester, and methacrylate; and the non-polar group comprises a polymer induced from any one or combination of ethylene, propylene, isobutylene, diene, and styrene.

5. The method of claim 2, wherein the amphiphilic additive is used in an amount of 0.01 wt % to 5 wt % in the mixture.

6. The method of claim 2, wherein the amphiphilic additive comprises at least one from polyisobutylene succinimide, polyisobutylene phenol-based dispersant, and polyacrylic-based dispersant.

7. The method of claim 1, wherein the bottom stream comprises organic materials in an amount of 90.0 wt % to 99.5 wt %.

* * * * *